US011909468B2

(12) United States Patent
Merrell

(10) Patent No.: US 11,909,468 B2
(45) Date of Patent: Feb. 20, 2024

(54) YAW DRIFT COMPENSATION FOR POINTING AN ANTENNA

(71) Applicant: Viasat, Inc., Carlsbad, CA (US)

(72) Inventor: Douglas J. Merrell, Buford, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 17/774,940

(22) PCT Filed: Nov. 9, 2020

(86) PCT No.: PCT/US2020/059725
§ 371 (c)(1),
(2) Date: May 6, 2022

(87) PCT Pub. No.: WO2021/096812
PCT Pub. Date: May 20, 2021

(65) Prior Publication Data
US 2022/0416846 A1  Dec. 29, 2022

Related U.S. Application Data

(60) Provisional application No. 62/934,128, filed on Nov. 12, 2019.

(51) Int. Cl.
*H04L 5/12* (2006.01)
*H04B 7/0426* (2017.01)
(Continued)

(52) U.S. Cl.
CPC ........... *H04B 7/043* (2013.01); *H04B 7/0617* (2013.01); *H04B 7/18508* (2013.01)

(58) Field of Classification Search
CPC ... H04B 7/043; H04B 7/0617; H04B 7/18508
(Continued)

(56) References Cited

U.S. PATENT DOCUMENTS

| 6,538,602 B2 | 3/2003 | Natsume et al. |
| 7,333,064 B1 | 2/2008 | Timothy et al. |

(Continued)

FOREIGN PATENT DOCUMENTS

| EP | 2698644 B1 | 3/2016 |
| JP | H0750514 A | 2/1995 |

(Continued)

OTHER PUBLICATIONS

International Search Report and Written Opinion dated Feb. 26, 2021 for PCT/US2020/059725, 12 pages.

*Primary Examiner* — Zewdu A Kassa
(74) *Attorney, Agent, or Firm* — Holland & Hart LLP

(57) ABSTRACT

A method for pointing an antenna can include positioning, by a positioner, a beam of an antenna mounted on a vehicle to an initial angular position towards a target satellite based on an initial pointing direction for the antenna, the initial pointing direction being defined in a fixed reference plane and communicating, from the antenna, a signal with the target satellite, wherein the positioner controls an orientation of a pedestal of the antenna. The method also includes, executing, by an antenna control unit (ACU), an offset compensation operation of the antenna. The offset correction operation can include adjusting a pointing direction of the antenna to a plurality of angular positions and selecting a scan offset angle based on measured signal metrics for the plurality of angular positions. The method can include calculating a yaw compensation of the antenna based on the initial pointing direction and on a yaw pointing direction.

20 Claims, 8 Drawing Sheets

(51) Int. Cl.
  *H04B 7/06* (2006.01)
  *H04B 7/185* (2006.01)

(58) Field of Classification Search
  USPC .............. 375/262, 260, 259, 219, 295, 316
  See application file for complete search history.

(56) References Cited

U.S. PATENT DOCUMENTS

| | | |
|---|---|---|
| 8,160,576 B2 | 4/2012 | Whelan et al. |
| 8,416,129 B2 | 4/2013 | Martens et al. |
| 9,513,376 B1 | 12/2016 | Heinrich et al. |
| 10,355,351 B2 | 6/2019 | Cummings et al. |
| 2010/0315288 A1 | 12/2010 | Liu et al. |
| 2015/0200449 A1* | 7/2015 | Sleight .................... H01Q 1/28 342/352 |
| 2017/0254903 A1 | 9/2017 | Johnson et al. |
| 2018/0233819 A1 | 8/2018 | Royalty |
| 2019/0013566 A1 | 1/2019 | Merrell |

FOREIGN PATENT DOCUMENTS

| | | |
|---|---|---|
| JP | 4191588 B2 | 9/2008 |
| JP | 5605539 B2 | 9/2014 |

* cited by examiner

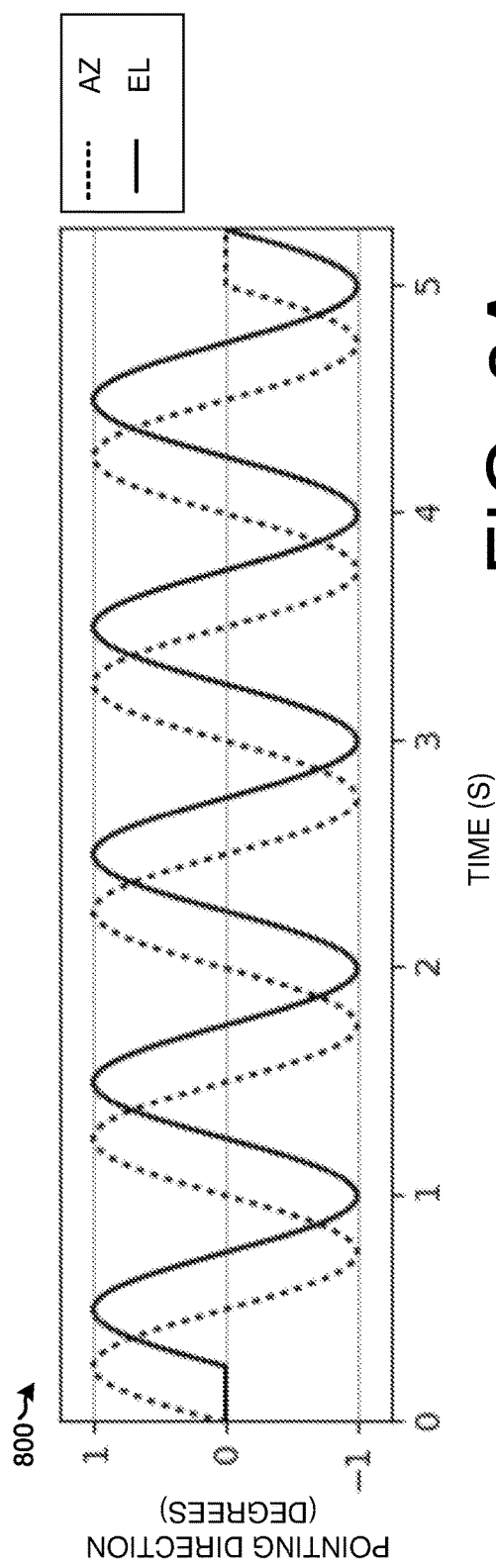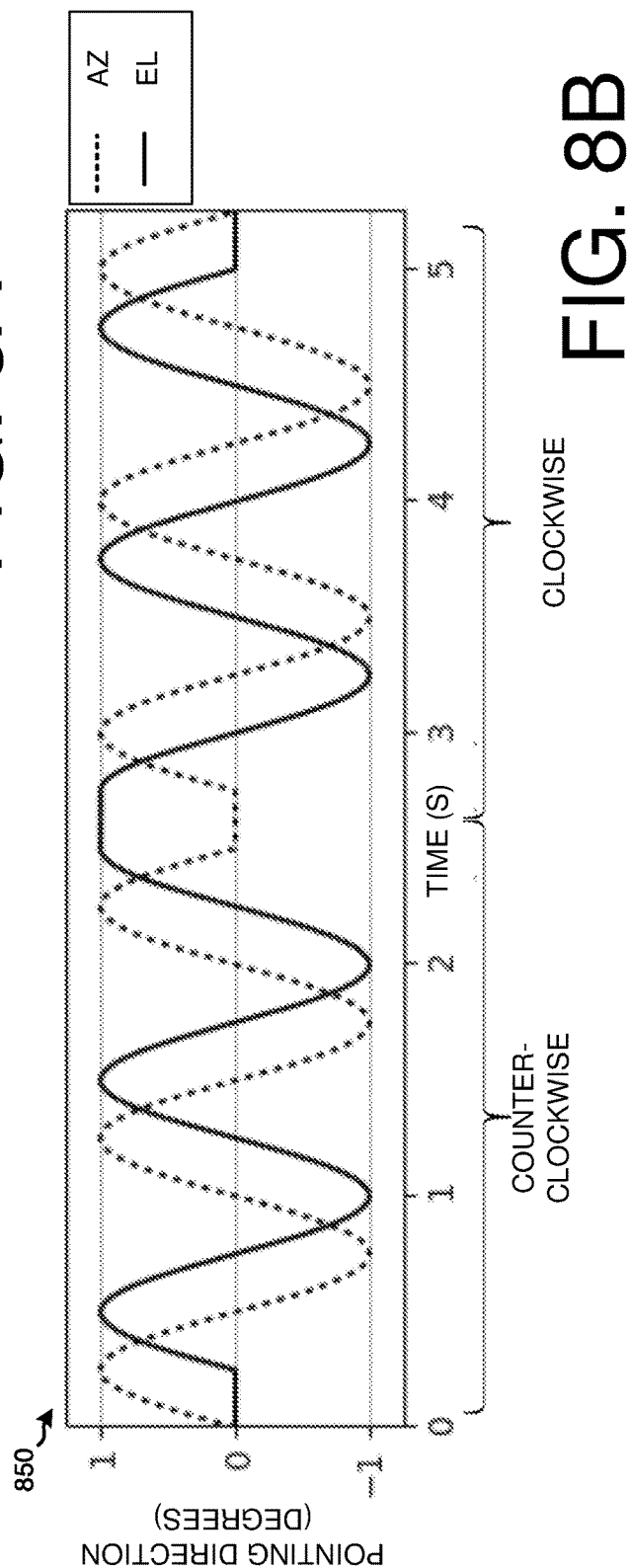

YAW DRIFT COMPENSATION FOR POINTING AN ANTENNA

RELATED APPLICATIONS

The present application is a 371 national phase filing of International Patent Application No. PCT/US2020/059725 by MERRELL, entitled "YAW DRIFT COMPENSATION FOR POINTING AN ANTENNA" filed Nov. 9, 2020, which claims the benefit of priority to U.S. Provisional Application No. 62/934,128 filed on Nov. 12, 2019, entitled, "Single-GPS MEMS-IRU Tracking", each of which is assigned to the assignee hereof, and each of which is expressly incorporated by reference herein, in its entirety.

TECHNICAL FIELD

This disclosure relates generally to rotatable antenna systems. More particularly, this disclosure describes an antenna system with a steerable antenna mounted on a vehicle.

BACKGROUND

A satellite antenna (e.g., a directional antenna) can be implemented as a satellite dish for a moveable station, such as an aircraft, a watercraft or a terrestrial vehicle. In some such examples, the satellite antenna includes a parabolic reflector and a feed antenna. Alternatively, the satellite antenna can be implemented as a waveguide array. Moreover, the support structure for the satellite antenna can include a pedestal (e.g., a base) on which the satellite antenna is mounted. Further, the pedestal can include a moveable joint or multiple pivot points to allow the satellite antenna to change an azimuth, elevation and/or skew to adjust the pointing of the satellite antenna.

Automatic tracking satellite antennas are satellite antennas used while a vehicle, such as an aircraft, a terrestrial vehicle or a watercraft is in motion. Automatic tracking satellite dishes utilize gyroscopes, global navigation satellite systems (GNSSs) position sensors, unique satellite identification data and an integrated data decoder to aid in identification of a particular satellite at which the satellite antenna is pointing. Automatic tracking satellite antennas include motors to drive and aim the satellite antenna and rate sensors to detect changes in position while the vehicle is in motion.

SUMMARY

In one example, a method for pointing an antenna is provided. The method can include positioning, by a positioner, a beam of an antenna mounted on a vehicle to an initial angular position towards a target satellite based on an initial pointing direction for the antenna, the initial pointing direction being defined in a fixed reference plane and communicating, from the antenna, a signal with the target satellite. The positioner controls an orientation of a pedestal of the antenna. The method can also include executing, by an antenna control unit (ACU), an offset compensation operation of the antenna. The offset correction operation can include adjusting a pointing direction of the antenna from the initial angular position to a plurality of angular positions and measuring a signal metric of the communicated signal at the plurality of angular positions and selecting a scan offset angle based on the measured signal metric for the plurality of angular positions. The scan offset angle can be defined in a local coordinate system for the pedestal of the antenna. The offset correction operation can also include calculating a yaw compensation of the antenna based on the initial pointing direction and on a yaw pointing direction in the fixed reference plane. The offset correction operation can further include rotating the initial pointing direction in the fixed reference plane with a platform orientation matrix that includes the yaw compensation and an attitude of the vehicle measured by an inertial navigation system (INS) into the local coordinate system for the pedestal of the antenna to provide pedestal orientation coordinates. The offset correction operation can yet further include determining an azimuth and elevation for the antenna based on the pedestal orientation coordinates and generating, by the ACU, a control signal characterizing the azimuth and elevation for the positioner that causes the positioner to adjust a pointing direction of the antenna corresponding to the azimuth and elevation for the antenna.

In another example, a system for pointing an antenna is provided. The system can include an antenna mounted on a pedestal and a modem coupled to the antenna operable to process signals communicated via the antenna. The system can also include a positioner coupled between the antenna and a vehicle, the positioner causing the pedestal to position the antenna based on a control signal. The system can further include an ACU operable to cause the positioner to point a beam of the antenna towards a target satellite for an initial satellite signal tracking mode during travel segments of the mobile vehicle. During the initial tracking mode, the ACU can command the positioner to set a beam of the antenna towards a target satellite based on an initial pointing direction for the antenna, the initial pointing direction being defined in a fixed reference plane to enable communication of a signal between the antenna and the target satellite. The ACU is operable to execute an offset compensation operation during travel segments of the vehicle. During the offset compensation operation, the ACU commands the positioner to adjust a pointing direction of the antenna from an initial angular position corresponding to the initial pointing direction to a plurality of angular positions and measures a signal metric of the communicated signal at the plurality of angular positions and selects a scan offset angle based on the measured signal metric for the plurality of angular positions. The scan offset angle is defined in a local coordinate system for the pedestal of the antenna. In the offset compensation operation, the ACU can also calculate a yaw compensation of the antenna based on the initial pointing direction and on a yaw pointing direction in the fixed reference plane. In the offset compensation operation, the ACU can further rotate the initial pointing direction in the fixed reference plane with a platform orientation matrix that includes the yaw compensation and an attitude of the vehicle measured by an INS into the local coordinate system for the pedestal of the antenna to provide pedestal orientation coordinates and determines an azimuth and elevation for the antenna based on the pedestal orientation coordinates. Additionally, in the offset compensation operation, the ACU can generate a control signal characterizing the azimuth and elevation for the positioner that causes the positioner to adjust a pointing direction of the antenna corresponding to the azimuth and elevation for the antenna.

BRIEF DESCRIPTION OF THE DRAWINGS

FIGS. 8A and 8B illustrate a pointing direction of an antenna plotted as a function of time during a signal tracking operation.

DETAILED DESCRIPTION

Figure 1:
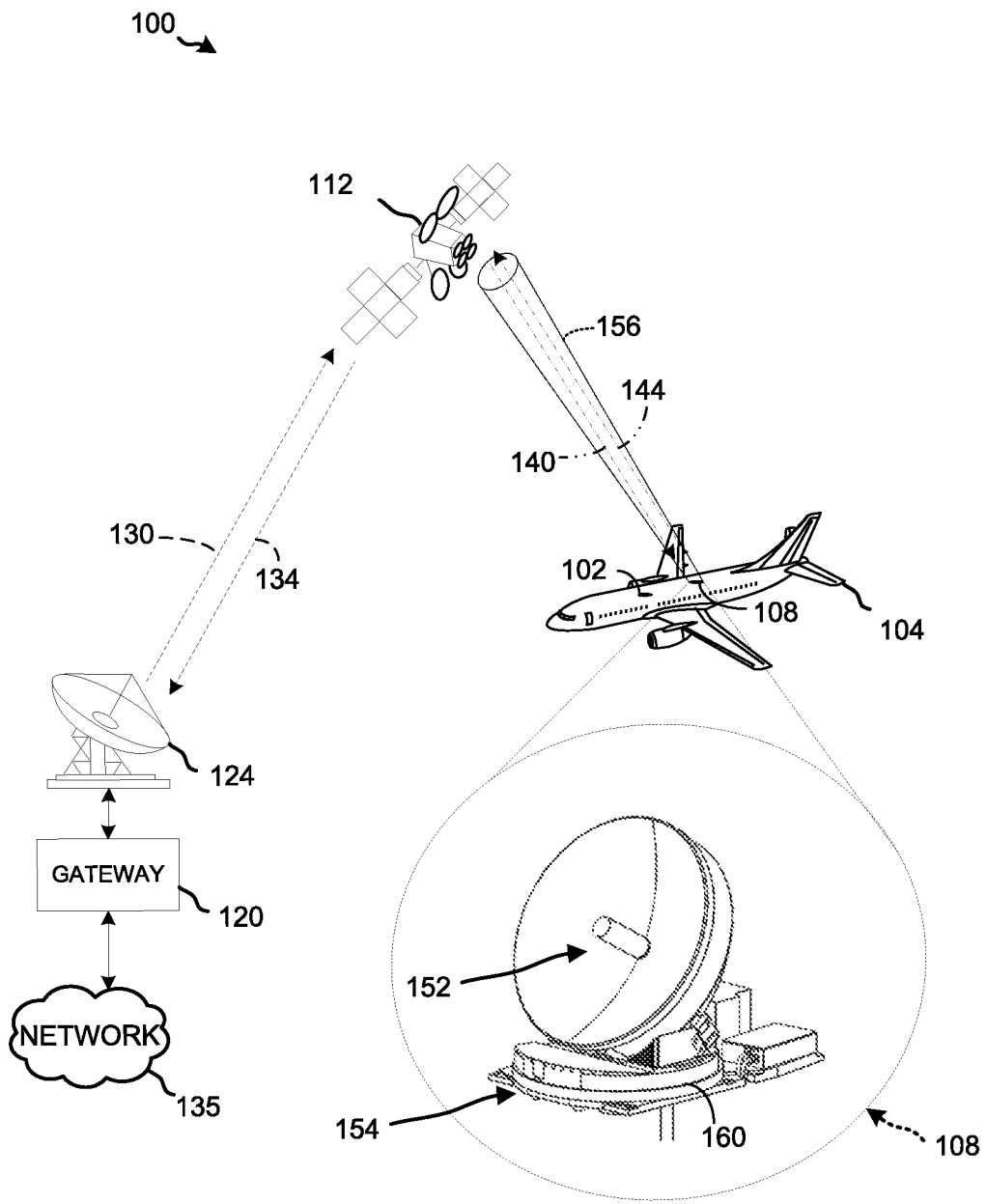
FIG. 1 illustrates an example satellite communications system that executes offset compensation to account for yaw drift in a MEMS gyroscope of an INS.

Systems and methods that are described herein are related to controlling a pointing of an antenna that compensates for yaw drift in an attitude measured by an inertial navigation system (INS) mounted on an aircraft for an antenna system mounted to a vehicle, such as an aircraft. In particular, INSs that employ micro gyroscopes, such as a micro electro-mechanical structure (MEMS) gyroscope, certain fiber-optical gyroscopes, etc. have a high gyroscope bias instability. For antenna pointing, a pitch and roll position measured by the MEMS gyroscope of the INS provide sufficient accuracy because gravity can provide a reference. However, yaw accuracy in the measured attitude drifts sufficiently that the yaw drift can impact performance of the antenna if there is no compensation for the yaw drift.

The antenna system can be mounted on a vehicle, such as an aircraft. The antenna system can include an antenna mounted on a pedestal. The pedestal can include a positioner for controlling a pointing direction of the antenna and a beam propagating from the antenna or being transmitted by the antenna. An antenna control unit (ACU) can provide commands to the positioner that causes the positioner to change an orientation of the pedestal, thereby changing a pointing direction of the antenna. The ACU is configured/programmed to command the positioner to position a beam of an antenna mounted on a vehicle to an initial angular position towards a target satellite based on an initial pointing direction for the antenna. The initial pointing direction is defined in a fixed reference frame, such as a local tangent plane or other coordinate system that is fixed with respect to the Earth. By positioning the beam in this matter, the antenna can communicate a signal with the target satellite.

As noted, over time, gyroscope bias instability causes yaw measurements of the INS to drift. To compensate for this yaw drift, the ACU can periodically and/or asynchronously execute an offset compensation operation of the antenna. The offset correction operation can include executing a signal tracking procedure (e.g., a conical/sine signal scan) wherein a pointing direction of the antenna is adjusted from the initial angular position to a plurality of angular positions. At each such angular position, a signal metric (e.g., signal strength) of the communicated signal is measured. The ACU can select a scan offset angle based on the measured signal metric for the plurality of angular positions. In some examples, the scan offset angle can be an angle at which the antenna has a peak signal strength. The scan offset angle can be defined in a local coordinate system for the pedestal of the antenna.

In the offset compensation operation, the ACU can calculate a yaw pointing direction in the fixed reference plane. The yaw pointing direction can be based on the scan offset angle in the pedestal local coordinate system and on a pedestal angle defined in the pedestal local coordinate system that corresponds to the initial angular position and the initial pointing direction in the fixed reference plane. The ACU can employ the yaw pointing direction and the scan offset angle to calculate a yaw compensation of the antenna.

The ACU can rotate the initial pointing direction in the fixed reference plane with a platform orientation matrix that includes the yaw compensation and the attitude of the vehicle measured by the INS into the local coordinate system for the pedestal of the antenna to provide pedestal orientation coordinates. The ACU can determine an azimuth and elevation for the antenna based on the pedestal orientation coordinates. Additionally, the ACU can generate a control signal characterizing the azimuth and elevation for the positioner that causes the positioner to adjust a pointing direction of the antenna corresponding to the azimuth and elevation for the antenna. By implementing the offset compensation operation, the ACU can curtail the impact of the yaw drift in the attitude measured by the INS. Thus, the need for an expensive ring laser gyroscope with a low bias instability can be obviated.

FIG. 1 illustrates an example satellite communications system 100 that executes offset compensation to account for yaw drift in a MEMS gyroscope or yaw drift in certain fiber-optic gyroscopes of an INS 102. The satellite communications system 100 includes a vehicle 104 (e.g., an aircraft) that has an antenna system 108 that supports wireless communications with a satellite (e.g., a target satellite 112). The INS 102 can be mounted on a platform (e.g., a fuselage) of the vehicle 104 Other examples for executing offset compensation offset calibration can have more or fewer features than the satellite communications system 100 of FIG. 1.

In some examples, the target satellite 112 provides bidirectional communication between the vehicle 104 and a gateway terminal 120. The gateway terminal 120 can be referred to as a hub or ground station. The gateway terminal 120 includes an antenna 124 that supports transmitting forward uplink signals 130 to the target satellite 112 and receiving return downlink signals 134 from the target satellite 112. The gateway terminal 120 can also schedule traffic communicated via the antenna system 108. Alternatively, the scheduling can be performed in other parts of the satellite communications system 100 (e.g., a core node, or other components, not shown).

The gateway terminal 120 can be provided as an interface between a network 135 and the target satellite 112. The gateway terminal 120 can be configured to receive data and information directed to the antenna system 108 from a source accessible via the network 135. The gateway terminal 120 can format the data and information and transmit forward uplink signals 130 to the target satellite 112 for delivery to the antenna system 108. Similarly, the gateway terminal 120 can be configured to receive forward downlink signals 134 from the target satellite 112 (e.g., containing data and information originating from the antenna system 108) that is directed to a destination accessible via the network 135. The gateway terminal 120 can also format the received return downlink signals 134 for transmission on the network 135.

The network 135 can be any type of network and can include for example, the Internet, an IP network, an intranet, a wide area network (WAN), a virtual LAN (VLAN), a fiber optic network, a cable network, a public switched telephone network (PSTN), a public switched data network (PSDN), a public land mobile network, and/or any other type of network supporting communication between devices as described herein. The network 135 can include both wired and wireless communications links as well as optical links. The network 135 can connect multiple gateway terminals 120 that can be in communication with the target satellite 112 and/or with other satellites.

The target satellite 112 can receive the forward uplink signals 130 from the gateway terminal 120 and transmit corresponding forward downlink signals 140 to the antenna system 108. The target satellite 112 can also receive return uplink signals 144 from the antenna system 108 and transmit corresponding return downlink signals 134 to the gateway terminal 120. The forward uplink signals 130 and/or return downlink signals 134 that are communicated between the gateway terminal 120 and the target satellite 112 can use the same, overlapping, or different frequencies as the return uplink signals 144 and/or the forward downlink signals 140 communicated between the target satellite 112 and the antenna system 108. The target satellite 112 can operate in a multiple spot beam mode, transmitting and receiving a number of narrow beams directed to different regions on Earth. Alternatively, the target satellite 112 can operate in wide area coverage beam mode, transmitting one or more wide area coverage beams. In some examples, the target satellite 112 can be a geostationary satellite or a non-geostationary satellite, such as a low earth orbit (LEO) or medium earth orbit (MEO) satellite. Although only a single target satellite 112 is shown in the satellite communications system 100, other communications systems can have more than one target satellite 112, and such target satellites 112 can support various operations of unidirectional or bidirectional communications.

The target satellite 112 can be configured as a "bent pipe" satellite that performs frequency and polarization conversion of the received signals before retransmission of the signals to their destination. As another example, the target satellite 112 can be configured as a regenerative satellite that demodulates and re-modulates the received signals before retransmission.

The antenna system 108 is mounted on a platform of the vehicle 104, which is an aircraft in the illustrated example. More generally, the antenna system 108 can be mounted on various types of vehicles 104 such as aircraft (e.g., airplanes, helicopters, drones, blimps, balloons, etc.), trains, automobiles (e.g., cars, trucks, busses, etc.), watercraft (e.g., private boats, commercial shipping vessels, cruise ships, etc.) and others.

In some examples, the antenna system 108 is used for bidirectional (two-way) communication with the target satellite 112. In other examples, the antenna system 108 can be used for unidirectional communication with the target satellite 112, such as a receive-only implementation (e.g., receiving satellite broadcast television). Although only one antenna system 108 is illustrated in FIG. 1, other satellite communications systems that execute the offset compensation operation can include more than one vehicle 104 having an antenna system 108, or one vehicle 104 having more than one antenna system 108.

The antenna system 108 includes an antenna 152 associated with a beam 156 that supports communication between the vehicle 104 and the target satellite 112. In the example illustrated, the antenna 152 is implemented as a satellite dish with an antenna feed and a parabolic reflector. However, in other examples, the antenna 152 can be an array of waveguide antenna elements arranged in a rectangular panel. In still other examples, the antenna 152 can be a different type of antenna, such as a phased array antenna, a slot array antenna, etc.

The beam 156 of the antenna 152 that is pointed towards the target satellite 112 has sufficient antenna gain in the direction of the target satellite 112 to permit communication of signals. The communication can be bidirectional (e.g., by the antenna 152 transmitting a signal to the target satellite 112 and also receiving a signal from the target satellite 112) or unidirectional (e.g., the antenna 152 either transmitting a signal to the target satellite 112 or receiving a signal from the target satellite 112, but not both).

The antenna 152 is mounted on a pedestal 154. The pedestal 154 is mounted on the vehicle 104. The pedestal 154 can include a positioner 160 for pointing the beam 156 towards the target satellite 112 (e.g., along an estimate of an aligned direction from the antenna 152 to the target satellite 112, which can be referred to as a satellite look angle) using the techniques described herein. In the example of the antenna system 108, the positioner 160 includes an alignment mechanism (e.g., gears) that can be actuated by a control signal from an ACU (hidden from view) to control pointing of the beam 156 towards the target satellite 112 about two rotational degrees of freedom (e.g., elevation and azimuth).

Based on the location of the target satellite 112, the location of the vehicle 104, and the attitude (e.g., yaw, roll, and pitch) of the vehicle 104, the ACU of the antenna system 108 can operate in an initial satellite tracking mode to determine and provide a control signal to the positioner 160 to maintain pointing of the beam 156 at the target satellite 112 as the vehicle 104 and/or the target satellite 112 moves. In some examples, the direction of maximum gain of the beam 156 can be aligned with the direction of the target satellite 112. Alternatively, the gain of the beam 156 in the direction from the antenna 152 to the target satellite 112 can be less than the maximum gain of the beam 156, due to the direction of maximum gain being aligned in a direction different from the direction to the target satellite 112. In some examples, such misalignment can be due to pointing accuracy limitations of the antenna 152, offsets in sensors of the vehicle 104 including, offsets of the antenna system 108, or an antenna platform misalignment (e.g., an alignment difference between a sensor of the vehicle 104 and the antenna system 108). The difference between the direction of maximum gain of the beam 156 and the direction from the antenna 152 to the target satellite 112 is referred to herein as the pointing error.

In particular, the vehicle 104 can include an INS 102 that measures an attitude of the vehicle. The attitude can be measured by a MEMS gyroscope or a fiber optic gyroscope of the INS. However, the MEMS gyroscope or the fiber optic gyroscope has an unpredictable amount of yaw drift in the measured attitude. Thus, the yaw drift of the INS 102 can contribute to the pointing error.

To curtail the pointing error, the antenna system 108 (e.g., as directed by the ACU) can execute offset compensation operations that compensate for the yaw drift in the attitude measured by the INS 102 for the vehicle 104 while the antenna system 108 is communicating user data during travel segments of the vehicle 104. As used herein, a spatial condition can refer to a spatial position and/or orientation of the antenna 152, the vehicle 104, or both. For example, a spatial condition can refer to one or more of an antenna azimuth direction, an antenna elevation direction, a vehicle yaw angle (e.g., heading), a vehicle roll angle, a vehicle pitch orientation, a relative position between the antenna 152 and the vehicle 104, etc. The ACU can determine a yaw compensation that is employable to determine pedestal orientation coordinates and a residual elevation offset to point the antenna 152.

An offset compensation operation executed by the ACU can include sweeping a pointing direction (e.g., elevation and azimuth or other properties) of the beam 156 in different directions while communicating with the target satellite 112, and measuring a signal metric (e.g., signal strength and/or gain) associated with the communications at the different directions. By sweeping the direction of the beam 156 in different directions while communicating with the target satellite 112, the ACU can determine an orientation of the beam 156 associated with a peak value of the measured signal characteristic.

For example, the ACU can set the antenna 152 to an initial pointing direction that points the antenna 152 toward the target satellite 112 based on the location of the antenna 152 (e.g., provided as an approximation from a GNSS location of the antenna system 108 or from a GNSS location of another point of the vehicle 104, such as the INS 102), the location of the target satellite 112 (e.g., as provided by a previously determined orbital position and stored at the vehicle 104, from a location signal received from the target satellite 112 or some other source, or from a value calculated by the ACU based on an understood orbital path of the target satellite 112), and the attitude of the vehicle 104, as provided by the INS 102. In some examples, the location of the antenna 152 or the attitude of the vehicle 104 can be referred to as positional information of the vehicle 104. Similarly, the location of the target satellite 112 can be referred to as positional information of the target satellite 112. The initial pointing direction can be defined in a fixed reference plane that is a coordinate system based on the positional information of the vehicle 104 and the target satellite 112.

To support the offset compensation operation, the ACU can then determine misaligned directions that are different from the estimated aligned direction (e.g., as offset from the aligned direction by an angular increment), and cause the beam 156 to be pointed in the misaligned directions during communications with the target satellite 112. The antenna system 108, or some other supporting component (e.g., a modem) can measure a signal characteristic (e.g., a signal strength or a signal quality) of user data communicated at the respective misaligned directions of the beam 156.

Accordingly, while supporting user data communications via the beam 156 of the antenna 152 at the misaligned directions (e.g., without requiring, but not prohibiting the inhibiting of transmissions of the antenna 152, or while receiving transmissions from the target satellite 112 via the antenna 152), the ACU can employ signal tracking techniques to measure, or receive a measurement of a signal strength or a signal quality for the respective misaligned directions, and determine a "peaked" direction associated with the highest signal strength or signal quality of the user data. The orientation of the beam 156 when peaked can be determined based on the output from an antenna positioning motor or sensors (e.g., positional or angular encoders associated with a positioning mechanism) of the positioner 160 included in the pedestal 154 of the antenna system 108 used to assist in physically positioning the antenna 152.

For instance, in an example in which the antenna 152 is positioned using antenna positioning motors of the positioner 160 to support motion in an azimuth direction and in an elevation direction to sweep the yaw of the beam 156 in a sine scan or conical scan operation, the azimuth and elevation that is calculated for the antenna 152 to receive the strongest signal are used as the peaked orientation of the beam 156. The peaked orientation of the antenna 152 at the peaked direction can be referred to as a scan offset angle, and the scan offset angle can be defined in a local coordinate system of the pedestal 154.

Although such peaking operations can provide suitable beam pointing calibration within a similar range of spatial conditions (e.g., a similar orientation of the beam 156 in an azimuth direction of the antenna 152), the scan offset angle may not be suitable for other spatial conditions of the antenna system 108 (e.g., other azimuth and/or elevation orientations of the beam 156). For example, the antenna system 108 can be installed with the pedestal 154 having a misalignment between the antenna system 108 and the INS 102 of the vehicle 104, which in some examples can correspond to installation offsets between the INS 102 of the vehicle 104 and the antenna system 108 (e.g., a roll offset, a pitch offset, and/or a yaw offset). Additionally, as noted, over time the INS 102 can have drift in the measured attitude, particularly in the measured yaw of the vehicle 104. Accordingly, the ACU can be configured/programmed to calculate a yaw compensation that is based on the yaw of the antenna 152 at the scan offset angle as well as the yaw of the attitude measured by the INS 102. The yaw compensation can be employed to determine pedestal coordinates in the local coordinate system for the pedestal 154 for the antenna 152. Misalignment at the pedestal 154 can be associated with three or more degrees of freedom, whereas an offset compensation operation (e.g., a procedure to compensate for an azimuth offset and an elevation offset of the antenna system 108 at a particular spatial condition) can only compensate for two degrees of freedom. Thus, the pedestal coordinates can be employed to calculate an azimuth and elevation for the antenna 152 that compensates for the drift in the yaw provided by the INS 102 as well as the installation offsets between the INS 102 and the pedestal 154.

Although offset compensation operations can be executed concurrently with the communicating user data, the data rate supported by the antenna system 108 can be degraded while performing a particular offset compensation operation. For example, when pointing the beam 156 along the misaligned directions of an offset compensation operation, the gain of the antenna 152 can be reduced as a result of a lower gain portion of the beam 156 being aligned with the target satellite 112. Although the lower gain portion of the beam 156 can still support user data communication, the antenna system 108 can employ a reduced modulation and coding rate (e.g., a reduced modulation and coding scheme (MCS)) in order to provide reliable communication via the antenna 152 that is operating with the lower gain. Thus, the ACU can periodically and/or asynchronously execute the offset compensation operation to correct the misalignment of the antenna 152. Further, the offset compensation operation to compensate for yaw drift in the INS 102 can be scheduled more often when requested data rates are relatively low (e.g., when a reduced MCS would not impede the requested data rate), or can be scheduled less often or even postponed when requested data rates are relatively high (e.g., when a reduced MCS would impede the requested data rate).

In some examples the antenna system 108 can continue performing offset compensation operations (e.g., as directed by the ACU) during ongoing operation of the vehicle 104. In other words, the methods and apparatus described herein can also support providing ongoing refinement to compensate for the drift in the yaw angle of the attitude of the vehicle 104 as measured by the INS 102. The described offset compensation operation can obviate the need for an INS with a high gyroscope bias stability (e.g., an INS with an expensive ring laser gyroscope). Instead, the INS 102 can be implemented as a relatively inexpensive component that includes a MEMS gyro or a fiber-optic gyroscope.

Figure 2:
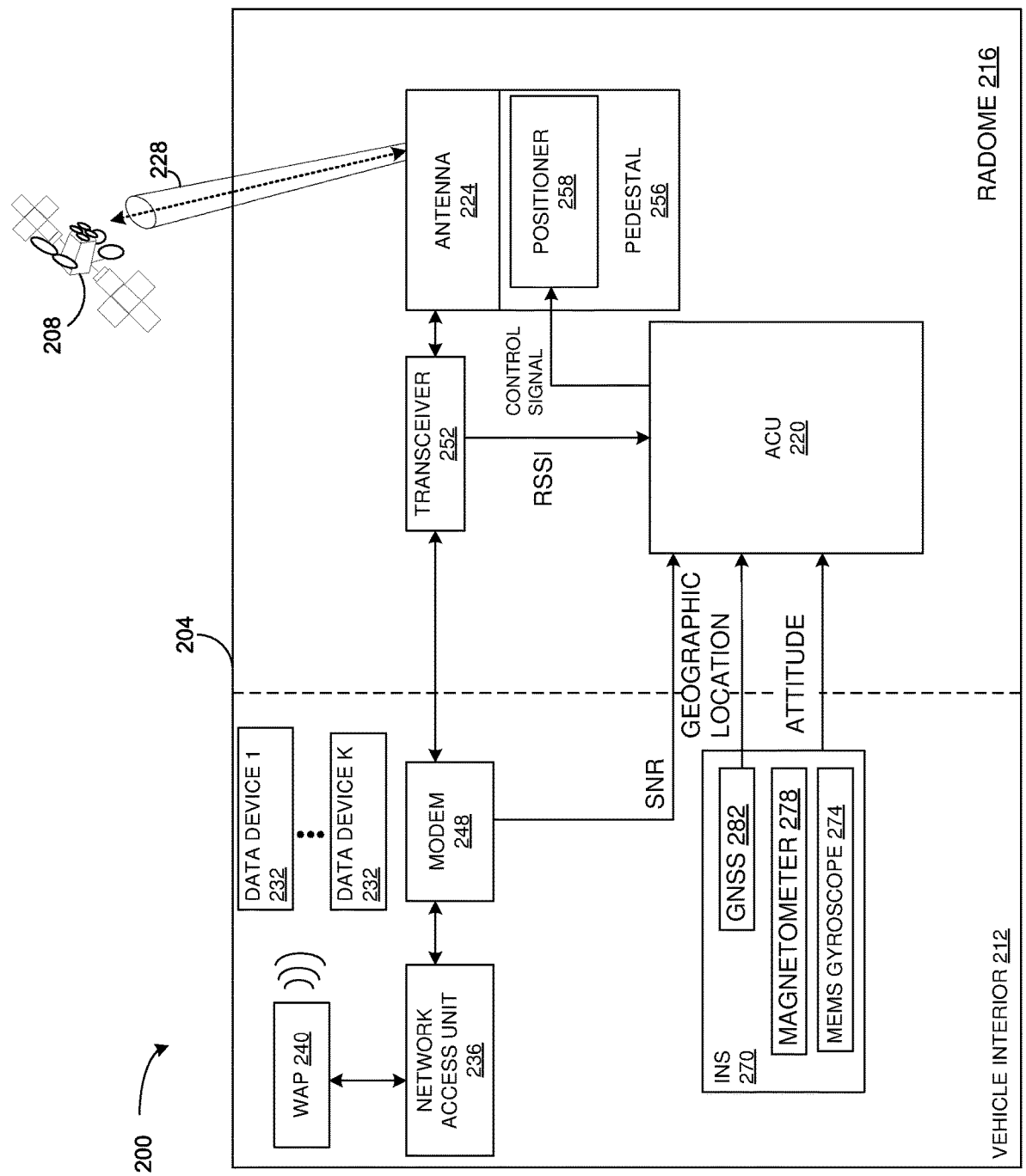
FIG. 2 is a block diagram illustrating an example of an antenna system that supports offset compensation operations for communications with a target satellite.

FIG. 2 is a block diagram illustrating an example of an antenna system 200 mounted on a vehicle 204 for communications with a target satellite 208, wherein the antenna system 200 supports offset compensation operations. The vehicle 204 can be employed to implement the vehicle 104 of FIG. 1, and the antenna system 200 can be employed to implement the antenna system 108 of FIG. 1. Similarly, the target satellite 208 can be employed to implement the target satellite 112 of FIG. 1. In the illustrated example, the components of the antenna system 200 are distributed between a vehicle interior 212 and a radome 216 (e.g., mounted to the exterior of the vehicle 204), and certain aspects of the operation of the antenna system 200 can be managed by an ACU 220. Other configurations of an antenna system 200 that supports offset compensation operations having more or fewer components than the example antenna system 200 are possible. Additionally, the illustrated components can be arranged in different locations of the vehicle 204 and/or the functionalities described herein can be distributed among the components in a different manner than described.

The antenna system 200 includes an antenna 224 that is housed under the radome 216, which can be disposed on the top of the body or other location (e.g., on the tail, etc.) of the vehicle 204. The antenna 224 is associated with a beam 228 that can support transmission of a return uplink signal and/or reception of a forward downlink signal (e.g., the return uplink signal 144 and/or the forward downlink signal 140 of FIG. 1) to support one-way or two-way data communication between a network and the vehicle 204 and/or K number of data devices 232 associated with (e.g., within) the vehicle 204, where K is an integer greater than or equal to one. The data devices 232 can include mobile devices (e.g., smartphones, laptops, tablets, netbooks, etc.) such as personal electronic devices (PEDs) brought onto the vehicle 204 by passengers. In some examples, the data devices 232 can include a portion of the vehicle 204 itself, such as passenger seat-back systems or other devices on the vehicle 204.

The K number of data devices 232, or some subset thereof, can communicate with a network access unit 236 via a communication link that can be wired or wireless. The communication links can be, for example, part of a local area network such as a wireless local area network (WLAN) supported by a wireless access point (WAP) 240. In some examples, there can be multiple WAPs 240 that are distributed about the vehicle 204, and can, in conjunction with a network access unit 236, provide traffic switching or routing functionality. The network access unit 236 can also allow passengers to access one or more servers local to the vehicle 204, such as a server on an airplane that provides in-flight entertainment.

In operation, the network access unit 236 can provide uplink data received from the K number of data devices 232 to a modem 248 to generate modulated uplink data (e.g., a transmit intermediate frequency (IF) signal) for delivery to a transceiver 252, where one or both of the modem 248 and the transceiver 252 can be a part of the antenna system 200, or otherwise interface with the antenna system 200. The transceiver 252 can upconvert and amplify the modulated uplink data to generate a return uplink signal (e.g., the return uplink signal 144 described with reference to FIG. 1) for transmission to the target satellite 208 via the antenna 224. The transceiver 252 can also receive a forward downlink signal (e.g., the forward downlink signal 140 of FIG. 1) from the target satellite 208 via the antenna 224. The transceiver 252 can amplify and downconvert the forward downlink signal to generate modulated downlink data (e.g., a receive IF signal) for demodulation by the modem 248. The demodulated downlink data from the modem 248 can then be provided to the network access unit 236 for routing to the data devices 232. The modem 248 can be integrated with the network access unit 236, or can be a separate component. In some examples, the transceiver 252 is physically positioned on an exterior (outside) body of the vehicle 204 and under the radome 216. Alternatively, in other examples, the transceiver 252 can be located in a different location, such as the vehicle interior 212.

The antenna 224 can be mounted on a pedestal 256 of the antenna system 200 that has a controllable azimuth and elevation to control a pointing direction of the antenna 224. The pedestal 256 can include a positioner 258 that can include electronics (e.g., a controller) and gears that physically change the pointing direction of the antenna 224. For example, the antenna 224 can be a reflector antenna, and the feed elements and/or the reflector of the antenna 224 can be mechanically steered by the positioner 258 to point the beam 228 at the target satellite 208. In some examples, the positioner 258 can be an elevation-over-azimuth (EL/AZ), two-axis positioner that provides adjustment of the beam 228 in azimuth and elevation. The positioner 258 can mechanically point the beam 228 of the antenna 224 in the direction of the target satellite 208 in response to a control signal from the ACU 220 as the vehicle 204 and/or the target satellite 208 moves.

In some examples, the positioner 258 can be implemented as a beamformer that is logically coupled between the modem 248 and the transceiver 252 to electronically direct the beam 228. For instance, in some examples, the antenna 224 can be a stationary (non-moveable), fully electronic scanned phased array antenna. In such a situation, the positioner 258 can include feed networks and phase controlling devices to properly phase signals communicated with some or all of the antenna elements of the antenna 224 to steer the beam (e.g., in azimuth and elevation). In this example, the positioner 258 can electronically point the beam 228 of the antenna 224 in the direction of the target satellite 208 in response to the control signal from the ACU 220 as the vehicle 204 and/or the target satellite 208 move. Moreover, in this situation, the positioner 258 can be logically positioned between the modem 248 and the transceiver 252 to adjust the signals therebetween.

In some examples, the positioner 258 can be representative of an electromechanical positioner and the antenna 224 can be an electro-mechanically steered array such as a variably inclined continuous transverse stub (VICTS) antenna, which can include one mechanical scan axis and one electrical scan axis that are each controlled by the positioner 258. In still other examples, the positioner 258 can be implemented as a different type of positioner that corresponds to a particular antenna type employed to implement the antenna 224.

Accordingly, the control signal provided from the ACU 220 can adjust the angular direction of the beam 228 on the manner in which the positioner 258 is controlled. As used herein, the term "control signal" represents a single signal or multiple separate signals provided by the ACU 220 to the positioner 258, which in turn can be provided on one or more signaling connections. For example, in some examples in which a positioner 258 adjusts the angular direction of the beam in multiple axes (e.g., azimuth and elevation), the control signal includes a control signal indicating the angular value of each axis. The functions of the ACU 220 can be implemented in hardware, instructions embedded in memory and formatted to be executed by one or more general or application specific processors, firmware, or any combination thereof.

During operation, as the vehicle 204 moves relative to the target satellite 208, the ACU 220 can provide the control signal to the positioner 258 that causes the positioner 258 to point the beam 228 of the antenna 224 in the direction of the target satellite 208. The ACU 220 can determine the appropriate angular alignment based on the location of the target satellite 208, the location of the vehicle 204, and the attitude (e.g., yaw, roll, and pitch) of the vehicle 204 measured by an INS 270. The ACU 220 can, for example, store or otherwise receive data indicating the location of the target satellite 208.

The INS 270 can measure the attitude (roll, pitch and yaw) of the vehicle 204. In some examples, to facilitate the measurement, the INS 270 can include a MEMS gyroscope 274. In other examples, a fiber-optic gyroscope can be employed in place of the MEMS gyroscope 274. Additionally, the INS 270 can include a magnetometer 278 that is employable to measure a heading of the vehicle 204 and a global navigation satellite system (GNSS) 282 that can be employed to measure a course of the vehicle 204 that is employable to approximate the heading of the vehicle 204. The GNSS 282 can be implemented, for example, as a global positioning satellite (GPS) system, a GLONASS system, a BeiDou Navigation Satellite System (BDS), a Galileo system, etc. Additionally, in some examples, the GNSS 282 may be external to the INS 270. In some examples, the GNSS 282 can be employed to determine the geographic location of the vehicle 204. Measurements of the heading of the vehicle 204 by the magnetometer 278 are inaccurate and have a significant amount of drift. Additionally, the accuracy of the approximation of the heading of the vehicle 204 is dependent on the speed of the vehicle 204 and the type of the vehicle 204.

The attitude of the vehicle measured by the INS 270 inherently includes an unpredictable drift that varies over time due to bias instability. To curtail a portion of the bias instability, the INS 270 can be command or configured/programmed to cause the INS 270 to measure the attitude of the vehicle 204 with the MEMS gyroscope 274. That is, to curtail the impact of inaccuracies in the measured heading of the vehicle 204 by the magnetometer 278 and the inaccuracies in the heading of the vehicle 204 approximated by the GNSS 282, the INS 270 can make measurements of the attitude for the vehicle 204 that are independent of measurements of the GNSS 282 and the magnetometer 278. In fact, in some examples, the magnetometer 278 may be omitted, and/or the GNSS 282 is external to the INS 270, such that the INS 270 relies solely on the MEMS gyroscope 274 to measure the attitude of the vehicle 204. In some examples, the ACU 220 can command the INS 270 to measure attitude for the vehicle 204 independent of measurements of the GNSS 282 and the magnetometer 278. In other examples, the INS 270 can be commanded to operate in this manner by a different device. In still other examples, the INS 270 can be preprogrammed to operate in this manner.

To curtail pointing error associated with aligning the beam 228 with the target satellite 208, the ACU 220 can provide the control signal in accordance with offset compensation operations during the communication of user data for the data devices 232. In some examples, the offset compensation operations can be implemented as embedded instructions that are executed by a processing unit of the ACU 220. In other examples, the offset compensation operations can be executed by an external computing system, wherein commands are provided to the ACU 220 as a result of the offset compensation operations. The offset compensation operations can compensate for yaw drift in the attitude measured by the INS 270. Additionally, the offset compensation operations can compensate for installation offsets of the INS 270 relative to the pedestal 256.

The ACU 220 can implement an initial satellite signal tracking mode upon the vehicle 204 entering service. The initial satellite signal tracking mode can track the target satellite 208 using positional information (e.g., a position of the target satellite 208, a position of the vehicle 204, and an attitude of the vehicle 204). The pointing direction of the antenna 224 can be set to an initial angular position that is based on the positional information, which defines an initial pointing direction in a fixed reference plane, such as a local tangent plane. Setting the antenna 224 to the initial angular position enables communication of a signal between the target satellite 208 and the antenna 224.

As used herein, the term "fixed reference plane" refers to a fixed coordinate system with respect to the Earth, which can alternatively be referred to as a geographical coordinate system. The local tangent plane is an example of a fixed reference plane that is based on the local vertical direction and the Earth's axis of rotation of the vehicle 204 and the target satellite 208. Throughout this disclosure, for illustrative purposes, examples are provided with respect to a local tangent plane. However, in other examples, a different fixed reference plane could also be employed.

Upon setting the antenna 224 to the initial pointing direction characterized in the local tangent plane, the ACU 220 can adjust a pointing direction of the antenna from the initial angular position to a plurality of angular positions (e.g., a direction sweep) during a signal tracking operation (e.g., a sine scan or conical signal tracking operation). Forward downlink signals can be provided to the transceiver 252 and the modem 248. The transceiver 252 can provide data characterizing a received signal strength indicator (RSSI), a signal-to-noise ratio (SNR), or a combination thereof from the transceiver 252, the modem 248 or from some other component indicating the signal metric of a forward downlink signal received by the antenna 224 at various angular directions during a direction sweep that sweeps a yaw of the antenna 224 (implemented by changing an azimuth and elevation of the antenna 224). Additionally or alternatively, the transceiver 252 (or another component) can include a tracking receiver with amplitude modulation detection. In such an example, the transceiver 252 can employ signal processing techniques to divide the received signal into constituent components. The transceiver 252 can compare the constituent components of the received signal to determine a direction with a greatest signal strength to provide the signal metric at each angular position (or some subset thereof).

Accordingly, the ACU 220 can employ the RSSI, the SNR and/or the direction of the greatest signal strength for each angular position to measure a signal metric of the communicated signal at the plurality of angular positions. Based on an aggregate of the signal metrics measured for the plurality of angular positions, the ACU 220 can select a scan offset angle, the scan offset angle being defined in a local coordinate system for the pedestal 256 of the antenna 224. The scan offset angle can define a predicted or measured pointing direction where the signal communicated between the target satellite 208 and the vehicle 204 has a peak characteristic (e.g., maximum signal strength or SNR).

The ACU 220 can rotate the initial pointing direction in the local tangent plane with a platform orientation matrix that includes the attitude from the INS 270 for the vehicle 204 and the installation offsets, and the initial pointing direction in the local tangent plane to determine a pedestal angle for the pedestal 256 in a local coordinate system of the pedestal 256. The ACU 220 can add (or otherwise combine) the pedestal angle with the scan offset angle, both of which are defined in the local coordinate system of the pedestal 256, to determine a measured satellite position in the local coordinate system of the pedestal 256.

The ACU 220 can employ a yaw rotation matrix to rotate the measured satellite position in the local coordinate system of the pedestal 256 into the local tangent plane. The yaw rotation matrix is employable to rotate an angle (e.g., the measured satellite position in the local coordinate system of the pedestal 256) to the local tangent plane without removing a yaw component of the measured satellite position in the local coordinate system of the pedestal 256 to a yaw pointing direction that is defined in the local tangent plane. The ACU 220 can calculate a yaw compensation for the antenna 224 based on the initial pointing direction and the yaw pointing direction, both of which are in the local tangent plane. The yaw compensation can be calculated in a number of ways, including filtering operations (e.g., an alpha-beta filter, a Kalman filter, etc.) and/or through linear algebra techniques.

The ACU 220 can rotate the initial pointing direction in the local tangent plane with the platform orientation matrix that includes the attitude of the vehicle 204 provided from the INS 270 to provide pedestal orientation coordinates in the local coordinate system of the pedestal 256.

The ACU 220 can determine an azimuth and elevation (or other pointing directions) for the pedestal coordinates. In some examples, the ACU 220 can employ the scan offset angle, the pedestal angle, and the pedestal orientation coordinates to determine an elevation offset that can be employed to further adjust the elevation. The ACU 220 can provide a control signal to the positioner characterizing the resultant azimuth and elevation. In response, the positioner 258 can adjust a pointing direction of the antenna 224.

Results from the offset compensation operation can be stored in memory (e.g., memory/storage associated with the ACU 220). Additionally, as noted, the offset compensation operation can be executed multiple times. To compensate for backlash of gears of the positioner 258, the ACU can be configured to command the positioner 258 to rotate in opposing directions that change the azimuth and elevation of the antenna 224 during consecutive executions of the signal tracking operation. For instance, if the antenna 224 is rotated in the counter-clockwise direction in a signal tracking operation for a first execution of the offset compensation operation, during a signal tracking operation of a second execution of the offset compensation operation, the ACU 220 can command the antenna 224 to rotate in the clockwise direction.

In some examples the antenna system 200 can continue performing offset compensation operations (e.g., as directed by the ACU 220) during ongoing operation of the vehicle 204. In other words, the methods and apparatus described herein can also support providing ongoing refinement to compensate for the drift in the yaw angle of the attitude of the vehicle 204 as measured by the INS 270. The described offset compensation operation can obviate the need for an INS with a high gyroscope bias stability (e.g., an INS with an expensive ring laser gyroscope). Instead, the INS 270 can be implemented as a relatively inexpensive component that includes a MEMS gyro.

Figure 3:
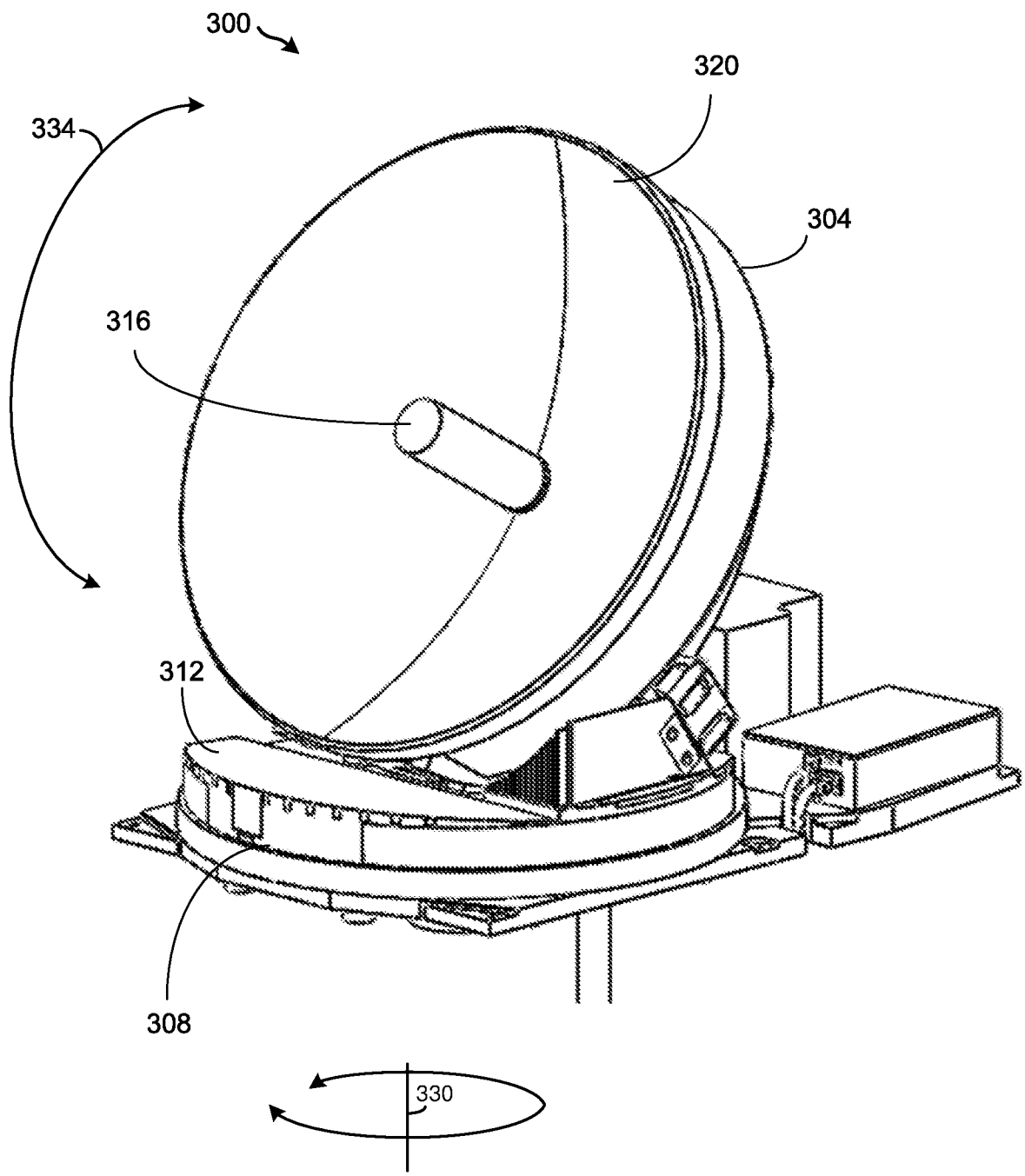
FIG. 3 illustrates a perspective view of an example of an antenna system that includes an antenna and a pedestal.

FIG. 3 illustrates a perspective view of an example of an antenna system 300 that includes an antenna 304 and a pedestal 308. The antenna system 300 is employable to implement the antenna system 108 of FIG. 1 and/or the antenna system 200 of FIG. 2. The pedestal 308 can include a positioner 312 for adjusting a pointing direction of the antenna 304.

The antenna system 300 supports offset compensation operations to compensate for yaw drift measured by an INS (e.g., the INS 102 of FIG. 1 and/or the INS 270 of FIG. 2). The antenna 304 includes a radiating element 316 and a parabolic dish 320. The positioner 312 can be responsive to control signals provided by an ACU (e.g., the ACU 220 of FIG. 2) to point a beam of the antenna 304 towards a target satellite (e.g., the target satellite 112 of FIG. 1 and/or the target satellite 208 of FIG. 2). In some examples, the positioner 312 can be implemented as an elevation-over-azimuth (EL/AZ) two-axis positioner that provides two-axis mechanical steering. The positioner 312 includes a mechanical azimuth adjustment mechanism to point the beam of the antenna 304 about an azimuth axis 330, and a mechanical elevation adjustment mechanism to point the beam of the antenna 304 in a direction indicated by arrows 334. Each of the mechanical adjustment mechanisms can include a motor with gears and/or other elements to change an orientation of the pedestal 308 to provide for movement of the antenna 304 about the corresponding axis. As mentioned above, in other examples the components used to point the beam of the antenna 304 can be different.

The antenna 304 can be mounted on the pedestal 308, which can in turn be mounted on a vehicle, where the pedestal 308 can be coupled between the vehicle and the positioner 312. The pedestal 308 can be associated with a reference frame (e.g., pedestal local coordinates) from which the orientation of a beam of the antenna 304 is measured. In other words, the pedestal 308 can provide a reference frame from which beam orientation is based (e.g., in elevation and azimuth). In some examples, the vehicle that the antenna 304 is mounted to can have a location provided for attaching the pedestal 308, such as a pattern of holes to accept mechanical fasteners for securing the pedestal 308 to a vehicle (e.g., the vehicle 104 of FIG. 1 and/or the vehicle 204 of FIG. 2).

The mounting location can be nominally prepared to provide a particular alignment between the pedestal 308 and the INS (e.g., the INS 102 of FIG. 1 and/or the INS 270 of FIG. 2) of the vehicle, such that the orientation of the beam of the antenna 304 can be provided with reference to the INS of the vehicle (e.g., based at least in part on the measured roll, pitch, and yaw of the vehicle 104 of FIG. 1). However, in some examples, an antenna platform misalignment between the pedestal 308 and the INS of the vehicle can result from manufacturing tolerances such as a planar skew of the mounting location for the pedestal 308, a planar skew of the surface of the pedestal 308 that contacts the vehicle, hole size and/or positional variations associated with the pedestal 308 and or the mounting location of the vehicle, size variations of the fasteners used to secure the pedestal 308 to the vehicle, and/or other considerations, which can collectively be referred to as installation offsets, which can be compensated for during pointing of the beam of the antenna 304.

Further, the INS can experience yaw drift over time that could cause misalignment between the target satellite and the beam of the antenna 304. Such yaw drift can cause pointing errors when pointing a beam of the antenna 304 towards the target satellite. Accordingly, the ACU can execute an offset compensation to compensate for such antenna platform misalignment, and curtail the pointing error associated with yaw drift at the INS.

Figure 4:
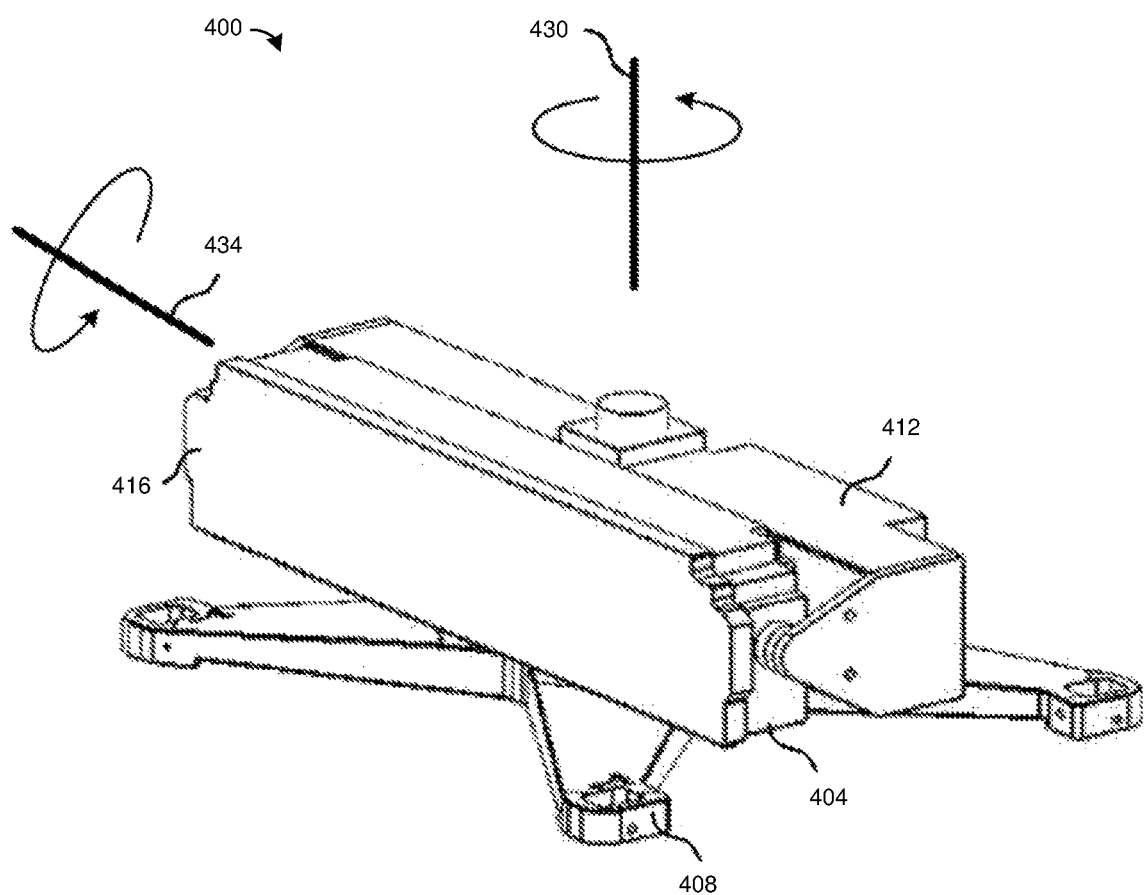
FIG. 4 illustrates a perspective view of another example of an antenna system that includes an antenna and a pedestal.

FIG. 4 illustrates a perspective view of another example of an antenna system 400 that includes an antenna 404 and a pedestal 408. The antenna system 400 is employable to implement the antenna system 108 of FIG. 1 and/or the antenna system 200 of FIG. 2. The pedestal 408 can include a positioner 412 for adjusting a pointing direction of the antenna 404.

The antenna system 400 supports offset compensation operations to compensate for yaw drift measured by an INS (e.g., the INS 102 of FIG. 1 and/or the INS 270 of FIG. 2). In the example 400, the antenna 404 includes an array 416 of antenna elements that can be a direct radiating two-dimensional array resulting in a boresight of the antenna 404 being normal to a plane containing the antenna elements of the array 416. Alternatively, the array 416 of antenna elements can be arranged (e.g., in a non-planar arrangement) or fed (e.g., by a beamformer) in a different manner such that the direction of highest gain of the antenna 404 is not normal to a the antenna elements of the array 416. In other examples, the antenna type of the antenna 404 can be different.

The positioner 412 can be responsive to control signals provided by an ACU (e.g., the ACU 220 of FIG. 2) to point a beam of the antenna 404 towards a target satellite (e.g., the target satellite 112 of FIG. 1 and/or the target satellite 208 of FIG. 2). Similar to the antenna system 300 of FIG. 3, the positioner 412 can be an EL/AZ two-axis positioner that provides two-axis mechanical steering. The positioner 412 includes a mechanical azimuth adjustment mechanism to point the beam of the antenna 404 about an azimuth axis 430, and a mechanical elevation adjustment mechanism to point the beam of the antenna 404 about an elevation axis 434. Each of the mechanical adjustment mechanisms can include a motor with gears and/or other elements to provide for movement of the antenna 404 about the corresponding axis. In other examples, the components used to point the beam of the antenna 404 can be different.

The antenna 404 can be mounted on the pedestal 408, which can be mounted to a vehicle, where the pedestal 408 can be coupled between the vehicle and the positioner 412. The pedestal 408 can be associated with a reference frame (e.g., pedestal local coordinates) from which the orientation of a beam of the antenna 404 is measured. In other words, the pedestal 408 can provide a reference frame from which beam orientation is based (e.g., in elevation and azimuth). In some examples, the vehicle (e.g., the vehicle 104 of FIG. 1 and/or the vehicle 204 of FIG. 2) that the antenna 404 is mounted to can have a location provided for attaching the pedestal 408, such as a pattern of holes to accept mechanical fasteners for securing the pedestal 408 to the vehicle.

The mounting location can be nominally prepared to provide a particular alignment between the pedestal 408 and an INS (e.g., the INS 102 of FIG. 1 and/or the INS 270 of FIG. 2) of the vehicle, which can be referred to as the installation offsets described herein. Further, the INS can experience yaw drift over time that could cause misalignment between the target satellite and the beam of the antenna 404. Such yaw drift can cause pointing errors when pointing a beam of the antenna 404 towards the target satellite. Accordingly, the ACU can execute an offset compensation to compensate for such antenna platform misalignment, and curtail the pointing error associated with yaw drift at the INS.

Figure 5:
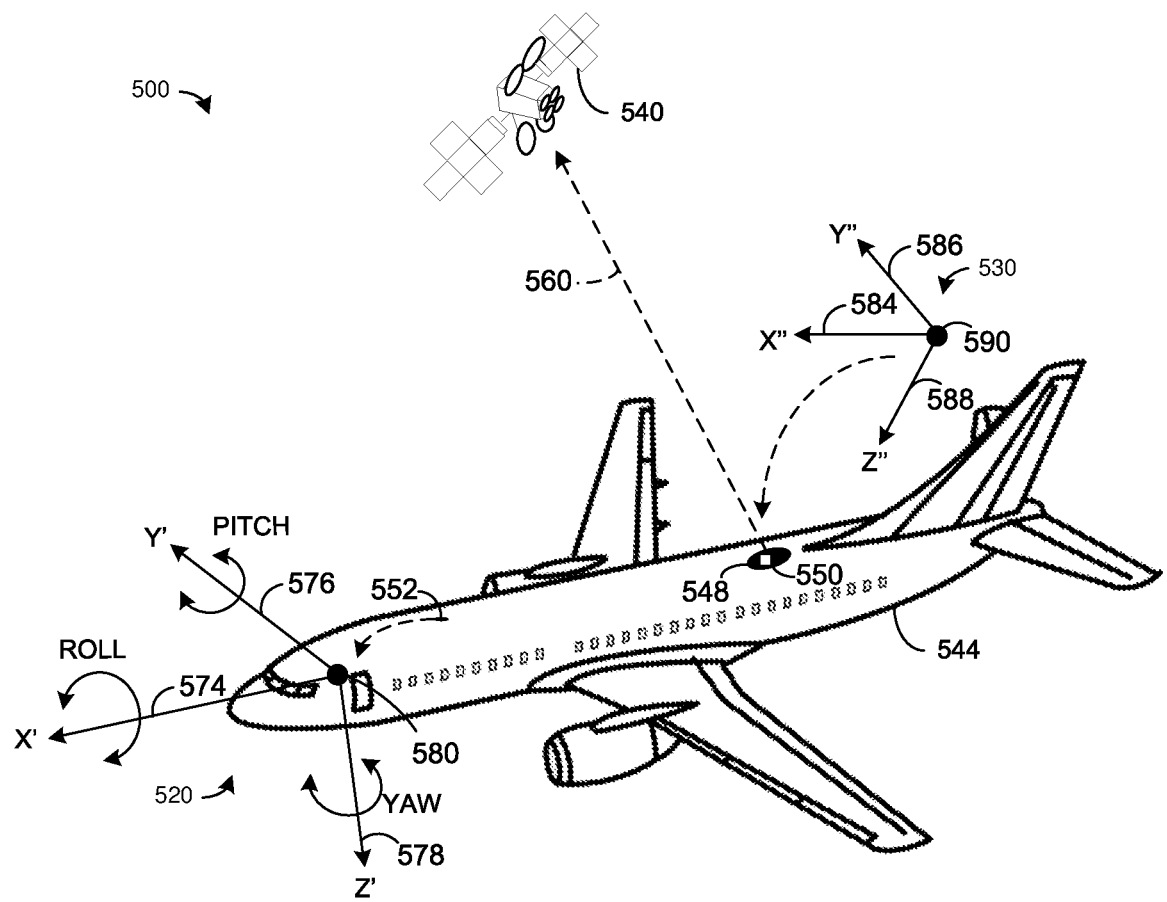
FIG. 5 is an illustration showing a local tangent plane, an INS local coordinate system and a pedestal local coordinate system that can be used to support offset correction operations.
Figure 5:
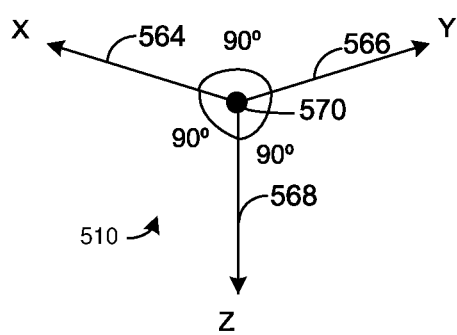

FIG. 5 is an illustration 500 showing a local tangent plane 510, an INS local coordinate system 520 and a pedestal local coordinate system 530 that can be used to support offset correction operations. The local tangent plane 510, the INS local coordinate system 520 and the pedestal local coordinate system 530 can each be implemented as reference frames. The local tangent plane 510, the INS local coordinate system 520, and the pedestal local coordinate system 530 can be employed to describe positional information associated with a target satellite 540 (e.g., the target satellite 112 of FIG. 1 and/or the target satellite 208 of FIG. 2) and a vehicle 544 having an antenna system 548 that includes an ACU 550, and an INS 552, which can be examples of the related components described with reference to FIGS. 1-4.

Further, the local tangent plane 510, the INS local coordinate system 520, and/or the pedestal local coordinate system 530 can each be used to identify a vector 560 from the antenna system 548 to the target satellite 540. Although each of the coordinate systems of the illustration 500 are described as a Cartesian coordinate system with three-dimensional reference frames having mutually orthogonal axes, the local tangent plane 510, the INS local coordinate system 520, and/or the pedestal local coordinate system 530 can be implemented as another type of coordinate system.

The local tangent plane 510 of the illustration 500 is an example of a three-dimensional, topocentric Cartesian coordinate frame. An X axis 564 of the local tangent plane 510 can be aligned with true North. A Y axis 566 of the local tangent plane 510 can be aligned with the compass heading of East. A Z axis 568 of the local tangent plane 510 can be aligned with an earth radian that emanates from an origin 570 of the local tangent plane 510 in a direction normal to a surface of the Earth, such as a direction normal to an oblate spheroid used to represent the Earth's ellipsoidal shape. The described alignment of the local tangent plane 510 can be referred to as a North, East, Down (NED) alignment in a global coordinate system. Each axis of the local tangent plane 510 is orthogonal and forms a 90 degree angle with each of the other axes. In some examples, the origin 570 of the local tangent plane 510 used by the INS 552 can be coincident with a latitude and longitude of the vehicle 544. In some examples, the altitude of the local tangent plane 510 can be assumed to be zero (e.g., the origin 570 of the local tangent plane 510 is at an earth surface, or an otherwise suitable reference elevation such as sea level).

The INS local coordinate system 520 can also be a three-dimensional Cartesian coordinate frame, and can be associated with the INS 552 mounted on the vehicle 544. An X' axis 574 of the INS local coordinate system 520 can be aligned with the longitudinal axis (e.g., from rear to front) of the vehicle 544. A Y' axis 576 of the INS local coordinate system 520 can be aligned with a lateral axis (e.g., from side to side) of the vehicle 544. A Z' axis 578 of the INS local coordinate system 520 can be aligned with the vertical axis (e.g., from top to bottom) of the vehicle 544. In contrast to the local tangent plane 510, which remains fixed in attitude with respect to earth, the INS local coordinate system 520 moves along with (e.g., is fixed with respect to) the vehicle 544. In other words, an origin 580 of the INS local coordinate system 520 can be fixed with respect to the vehicle 544 (e.g., at the location of the INS 552).

The attitude of the vehicle 544 can be defined by the set of rotations in roll, pitch and yaw between the INS local coordinate system 520 and the local tangent plane 510. Roll of the vehicle 544 can be defined as the rotation of the vehicle 544 about the X' axis 574 with reference to the X-Y plane of the local tangent plane 510 (e.g., as an angle between the Y' axis 576 of the INS local coordinate system 520 and the X-Y plane of the local tangent plane 510 when viewed along the X' axis 574). Pitch can be defined as the rotation of the vehicle 544 about the Y' axis 576 with reference to the X-Y plane of the local tangent plane 510 (e.g., as an angle between the X' axis 574 of the INS local coordinate system 520 and the X-Y plane of the local tangent plane 510 as the local tangent plane 510 viewed along the Y' axis 576). Yaw can be defined as the direction of the X' axis 574 of the INS local coordinate system 520 in the X-Y plane of the local tangent plane 510, which during level movement (e.g., level aircraft flight) can correspond to the rotation of the vehicle 544 about the Z' axis 578 of the INS local coordinate system 520 or the rotation of the vehicle 544 about the Z axis 568 of the local tangent plane 510.

In some examples, positional information indicating the attitude of the vehicle 544 can be output from the INS 552 in the form of three angular displacements. A first angular displacement can represent the rotation in roll, the second can represent the rotation in pitch and the third can represent the rotation in yaw. Although the INS local coordinate system 520 is shown as aligned with the vehicle 544, in some examples, the INS local coordinate system 520 can be offset from the alignment with the vehicle 544 due to misalignment between the vehicle 544 and the INS 552. In some examples the INS 552, or a controller associated with the vehicle 544, can compensate for such a misalignment through application of installation offsets. In some examples, the INS 552 can, therefore, provide values compensating for such misalignment between the INS 552 and the vehicle 544, such that the INS 552 provides attitude values for the vehicle 544 despite a misalignment between the INS 552 and the vehicle 544. In other examples, the INS 552 provides uncompensated values that are corrected by the receiver of the values, such as the ACU 550.

The pedestal local coordinate system 530 can also be a three-dimensional Cartesian coordinate frame, and can be associated with the antenna system 548 aboard the vehicle 544. An X" axis 584 of the pedestal local coordinate system 530 can be aligned with the longitudinal axis of the antenna system 548. A Y" axis 586 of the pedestal local coordinate system 530 can be aligned with the lateral axis of the antenna system 548. A Z" axis 588 of the pedestal local coordinate system 530 can be aligned with the vertical axis of the antenna system 548. The pedestal local coordinate system 530 moves along with (e.g., is fixed with respect to) the antenna system 548. In other words, an origin 590 of the pedestal local coordinate system 530 can be fixed with respect to the antenna system 548 (e.g., at the location of the antenna system 548).

Alignment of a beam of the antenna system 548 (e.g., along the vector 560) can be identified by the antenna system 548 relative to the pedestal local coordinate system 530. For example, the antenna system 548 (e.g., a positioner 160 of the antenna system 108 of FIG. 1 and/or the positioner 258 of the antenna system 200 of FIG. 2) can point the beam along the vector 560 by way of a two-dimensional definition of the elevation and azimuth orientations of the vector 560 with respect to the pedestal local coordinate system 530. The elevation of the vector 560 can be defined as an angle between the direction of the vector 560 and the X"-Y" plane of the pedestal local coordinate system 530. The azimuth of the vector 560 can be defined as an angle between the direction of the vector 560 and the X" axis 584 when viewed in the X"-Y" plane (e.g., an angle between the X" axis 584 and a projection of the vector 560 on the X"-Y" plane).

In some examples, the antenna system 548 and the INS 552 can be installed on the vehicle 544 with a particular relative orientation. For example, the antenna system 548 can be installed on the vehicle 544 such that the pedestal local coordinate system 530 is nominally aligned with the INS local coordinate system 520, such that the X' axis 574 is aligned with the X" axis 584, the Y' axis 576 is aligned with the Y" axis 586, and the Z' axis 578 is aligned with the Z" axis 588. However, the actual alignment between the pedestal local coordinate system 530 and the INS local coordinate system 520 can be different from the nominal alignment between the pedestal local coordinate system 530 and the INS local coordinate system 520, which can be referred to as an antenna platform misalignment. In other words, for various reasons including those described with reference to FIG. 2, the actual orientation of the pedestal local coordinate system 530 with respect to the INS local coordinate system 520 can be different from a nominal orientation of the pedestal local coordinate system 530 with respect to the INS local coordinate system 520. Accordingly, a set of installation offsets can be employed to translate a pointing direction in the INS local coordinate system 520 to the pedestal local coordinate system 530 or vice-versa.

In order to communicate signals via the antenna system 548 with the maximum signal strength, the ACU 550 of the antenna system 548, in an initial satellite signal tracking mode, the ACU 550 can command a positioner of the antenna system to align a beam of the antenna system 548 in the direction of the vector 560. The orientation of the vector 560 can be calculated based on determined values or approximations for the location of the target satellite 540, the location of the antenna system 548, and the attitude of the antenna system 548.

In some examples, the location of the target satellite 540 can be known and available to the ACU 550 of the antenna system 548 (e.g., from a position signal received by the ACU 550, from a position value stored at the ACU 550, or as a position determined by the ACU 550 based on orbital characteristics of the target satellite 540 known by the ACU 550), and can be expressed in coordinates of the local tangent plane 510. In some examples, the location of the target satellite 540 is provided to the ACU 550 from a modem (e.g., the modem 248 of FIG. 2) through an input port. In some examples, the origin of a reference frame used to define the location of the target satellite 540 (e.g., a reference frame in global coordinates that identifies a location in terms of latitude, longitude, and elevation) will be displaced from the origin 570 of the local tangent plane 510, having an origin at the location of the vehicle 544, and the location of the target satellite 540 can be transformed into the local tangent plane 510 (e.g., by the INS 552 or the ACU 550).

In some examples, the location of the antenna system 548 can be determined at the INS 552, such as with a GNSS that is substantially co-located with the antenna system 548 and provides positional information comprising the location of the antenna system 548. In other examples the location of the antenna system 548 can be assumed to be (e.g., approximated by) a location that is output by the INS 552 that provides positional information comprising the location of the INS 552 as determined by a GNSS (e.g., the GNSS 282 of FIG. 2). In examples where the antenna system 548 and the INS 552 are not co-located, positional error due to the different assembly locations of the INS 552 and the antenna system 548 can be assumed to be negligible and ignored, or the positional differences can be known and compensated for with the installation offsets (e.g., by the ACU 550).

Based on the location of the target satellite 540 and the antenna system 548, an initial pointing direction, $v_{LTP}$ can be calculated to represent the direction of the vector 560 in the local tangent plane 510. The initial pointing direction, $v_{LTP}$ can include three components, dx, dy, and dz, defined with respect to the local tangent plane 510 (e.g., along the X axis 564, the Y axis 566, and the Z axis 568, respectively).

In general, the vehicle 544 does not have an attitude that is aligned with the local tangent plane 510. That is, the vehicle 544 can have a heading other than North, an angular pitch displacement relative to the X-Y plane of the local tangent plane 510, an angular roll displacement relative to the X-Y plane of the local tangent plane 510, or various combinations thereof. In such cases, the initial pointing direction, $v_{LTP}$ can be transformed to the pedestal local coordinate system 530 using a platform orientation matrix, which generally transforms the representation of the initial pointing direction, $v_{LTP}$ from the local tangent plane 510 to the pedestal local coordinate system 530.

A pedestal angle, $v_{Ped}$ in the pedestal local coordinate system 530 can represent an orientation of the pedestal of the antenna system 548 to point in the direction of the vector 560. The pedestal angle, $v_{Ped}$ can be rotated into the local tangent plane 510 with a base rotation matrix, $R_{base}$ as defined in Equation 1.

$$v_{LTP} = R_{base} \cdot v_{Ped} \qquad \text{Equation 1:}$$

wherein:
$R_{base} = R(\psi_1, \theta_1, \varphi_1) \cdot R(\psi_{off}, \theta_{off}, \varphi_{off})$
$R(\psi, \theta, \varphi)$ is the rotation function defined in Equation 2;
$R(\psi_1, \theta_1, \varphi_1)$ is an INS orientation matrix;
$R(\psi_{off}, \theta_{off}, \varphi_{off})$ is a pedestal orientation matrix;
$\psi_1$ is the yaw of vehicle, as measured by the INS;
$\theta_1$ is the pitch of the vehicle, as measured by the INS;
$\varphi_1$ is the roll of the vehicle, as measured by the INS;
$\psi_{off}, \theta_{off}, \varphi_{off}$ are the installation offsets that can be predetermined or calculated by the ACU.

$$R(\psi,\theta,\varphi) = R_z(\psi) R_y(\theta) R_x(\varphi) \qquad \text{Equation 2}$$

wherein:

$$R_z(\psi) = \begin{bmatrix} \cos\psi & -\sin\psi & 0 \\ \sin\psi & \cos\psi & 0 \\ 0 & 0 & 1 \end{bmatrix}$$

$$R_y(\theta) = \begin{bmatrix} \cos\theta & 0 & \sin\theta \\ 0 & 1 & 0 \\ -\sin\theta & 0 & \cos\theta \end{bmatrix}$$

$$R_x(\varphi) = \begin{bmatrix} 1 & 0 & 0 \\ 0 & \cos\varphi & -\sin\varphi \\ 0 & \sin\varphi & \cos\varphi \end{bmatrix}$$

Conversely, the initial pointing direction in the local tangent plane, $v_{LTP}$ can be rotated to the pedestal local coordinate system 530 with a platform orientation matrix, $R_{platform}$ as defined in Equation 3. As illustrated in Equation 3, the platform orientation matrix, $R_{platform}$ is the transpose of the base rotation matrix, $R_{base}$.

$$v_{Ped} = R_{platform} \cdot v_{LTP} \qquad \text{Equation 3}$$

wherein:
$R_{platform} = R_{base}^T = [R(\psi_{off}, \theta_{off}, \varphi_{off})]^T (\psi_1, \theta_1, \varphi_1)^T$;
$v_{Ped} = [R(\psi_{off}, \theta_{off}, \varphi_{off})]^T (\psi_1, \theta_1, \varphi_1)^T \cdot v_{LTP}$
$[R(\psi_1, \theta_1, \varphi_1)]^T$ is the transpose of the INS orientation matrix, $R(\psi_1, \theta_1, \varphi_1)$; and
$[R(\psi_{off}, \theta_{off}, \varphi_{off})]^T$ is the transpose of the pedestal orientation matrix $R(\psi_{off}, \theta_{off}, \varphi_{off})$.

Conceptually, Equation 3 characterizes rotating the initial pointing direction, $v_{LTP}$ in the local tangent plane 510 with the platform orientation matrix, $R_{platform}$ to provide the pedestal angle, $v_{Ped}$ in the pedestal local coordinate system 530 for the pedestal. The platform orientation matrix, $R_{platform}$ including a pitch $\theta_1$, roll, $\varphi_1$ and yaw $\psi_1$ of the attitude of the vehicle provided from the INS 552. Thus, the ACU 550 can employ Equations 1-3 to rotate the vector 560 from coordinates in the local tangent plane 510 to the pedestal local coordinate system 530 or vice-versa.

As noted, the INS 552 can be implemented as the INS 102 of FIG. 1 and/or the INS 270 of FIG. 2. Accordingly, the INS 552 includes a MEMS gyroscope (e.g., the MEMS gyroscope 274 of FIG. 2) to measure the attitude of the vehicle 544. Accordingly, the yaw, $\psi_1$ output by the INS 552 has a drift that changes over time (e.g., at a rate of about 0.05-0.2 degrees per minute). The ACU 550 can execute offset compensation operations to compensate for the drift in the yaw, $\psi_1$ output by the INS 552.

During execution of an offset compensation operation, it is presumed that the ACU 550 can employ equations 1-3 to command the positioner of the antenna system 548 to point the antenna in an initial angular position corresponding to the pedestal angle, $v_{Ped}$, such that the beam of the antenna system 548 is pointed towards the target satellite 540.

After setting the pedestal to cause the beam to be pointed in the initial pointing direction, the ACU 550 can execute a signal tracking operation (e.g., a sine scan or conical scan operation) to determine a direction corresponding to a peak gain (or other signal metric) for a signal communicated from the target satellite 540 to the antenna system 548. During execution of the signal tracking operation, the ACU 550 commands the positioner to adjust a pointing direction of the antenna from the pedestal angle, $v_{Ped}$ (the initial angular position for the pedestal of the antenna system 548) to a plurality of angular positions. For each such position, the ACU 550 receives data from a modem and/or a transceiver (as described in FIG. 2) characterizing a measured signal metric of the communicated signal. The ACU 550 can select a scan offset angle, $v_{Scan}$ based on aggregated measured signal metrics for the plurality of angular positions (or the measured signal for a subset of the angular positions). The scan offset angle $v_{Scan}$ is defined in the pedestal local coordinate system 530. In some examples, such as a situation where the vehicle 544 is moving at a rate that exceeds a threshold velocity, the ACU 550 can execute the signal tracking operation multiple times to select the scan offset angle, $v_{Scan}$. In other words, in a situation where the vehicle 544 is stationary or is moving slowly, a single execution of the signal tracking operation can be executed to select the scan offset angle, $v_{Scan}$. Conversely, if the vehicle 544 is moving at a rate greater than the threshold velocity, at least two signal tracking operations are executed to calculate a yaw drift rate, $\Phi_{correct}$ that would be needed to accurately select the scan offset angle, $v_{Scan}$.

Continuing with the offset compensation operation, the ACU 550 can combine the scan offset angle, $v_{Scan}$ with the pedestal angle, $v_{Ped}$ to determine a measured satellite position, $v_{Ped\_Sat}$ in the pedestal coordinate system 530, and rotate the measured satellite position, $v_{Ped\_Sat}$ in the pedestal coordinate system 530 to the local tangent plane 510 without removing a yaw component of the measured satellite position $v_{Ped\_Sat}$ in the pedestal coordinate system 530, to determine a yaw pointing direction, $v_{Yaw}$ that is defined in the local tangent plane 510. More generally, the ACU 550 can employ Equation 4 to determine the yaw pointing direction, $v_{Yaw}$ that is defined in the local tangent plane 510 that represents a yaw component of the measured satellite position, $v_{Ped\_Sat}$ in the pedestal coordinate system 530.

$$v_{Yaw} = R(0, \theta_1, \varphi_1) \cdot (R(\psi_{off}, \theta_{off}, \varphi_{off})(v_{Ped} + v_{Scan}) \quad \text{Equation 4}$$

wherein:

$v_{Ped\_Sat} = v_{Ped} + v_{Scan}$ $R(0, \theta_1, \varphi_1) R(\psi_{off}, \theta_{off}, \varphi_{off})$ is a yaw rotation matrix that sets the yaw rotation to zero (or another predetermined value) to prevent removal of a yaw component of the measured satellite position, $v_{Ped\_Sat}$ in the pedestal coordinate system.

Conceptually, Equation 4 characterizes combining the pedestal angle, $v_{Ped}$ and the scan offset angle $v_{Scan}$ to provide a measured satellite position, $v_{Ped\_Sat}$ in the pedestal local coordinate system 530. Additionally, Equation 4 characterizes rotating the measured satellite position, $v_{Ped\_Sat}$, in the pedestal local coordinate system 530 with a yaw rotation matrix, $R(0, \theta_1, \varphi_1) \cdot R(\psi_{off}, \theta_{off}, \varphi_{off})$ to provide the yaw pointing direction in the local tangent plane 510.

Upon determining the yaw pointing direction, $v_{Yaw}$, the ACU 550 can employ Equation 5 to determine a measured yaw, $\psi_{measured}$ that defines azimuth (in degrees) of a difference between the a yaw (in degrees) the initial pointing direction, $v_{LTP}$ and the yaw pointing direction, $v_{Yaw}$ that are both defined in the local tangent plane 510.

$$\psi_{measured} = AZ(v_{LTP} - v_{Yaw}) \quad \text{Equation 5}$$

wherein:

$Az(v) = \arctan(v_y / v_x)$ $v_y$ is the Y component of the vector, $v$; and $v_x$ is the X component of the vector, $v$.

In some examples, the ACU 550 can select the measured yaw, $\psi_{measured}$ as a yaw compensation, $\psi_A$ for the antenna. In other examples, the ACU 550 can employ filtering techniques to determine the yaw compensation, $\psi_A$ for the antenna. For example, the ACU 550 can employ recursive filtering (e.g., an alpha-beta filter or a Kalman filter) to determine a residual yaw, b T residual and a next yaw correction, $\psi_{correct,i+1}$, and a next yaw correction rate, $\psi_{correct,i+1}$ that is based on the measured yaw, $\psi_{measured}$. In particular, the ACU 550 can employ Equations 6-8 to calculate the residual yaw, b T residual, the next yaw correction, b T correct and the next yaw correction rate $\psi_{correct}$.

$$\psi_{residual} = \psi_{measured} - (\psi_I + \psi_{correct,i}) \quad \text{Equation 6}$$

$$\psi_{correct,i+1} = \psi_{correct,i} + \alpha \cdot \psi_{residual} \quad \text{Equation 7}$$

$$\dot{\psi}_{correct,i+1} = \dot{\psi}_{correct,i} + \beta \frac{\psi_{residual}}{\Delta t} \quad \text{Equation 8}$$

wherein:

$\psi_I$ is the yaw as measured by the INS;

$\psi_{correct,i}$ is a current yaw correction;

$\dot{\psi}_{correct,i}$ is a current yaw correction rate;

$\Delta t$ is the time interval between the next yaw correction, $\psi_{correct,i+1}$ and the current yaw correction, $\psi_{correct,i}$;

$\alpha$ and $\beta$ are filter parameters.

In summary, the recursive filter employed by the ACU 550 provides the next yaw correction, $\psi_{correct,i+1}$, and the next yaw correction rate, $\dot{\psi}_{correct,i+1}$, to a value representing a relative location between the measured yaw, $\psi_{measured}$ and the current yaw correction, $\psi_{correct,i}$. The relative location between the measured yaw, $\psi_{measured}$ and the current yaw correction, $\psi_{correct,i}$ is based on $\alpha$ and $\beta$, which are values between zero (100% current estimation) and one (100% current measurement). In examples where the recursive filter is implemented as an alpha-beta filter, the values of $\alpha$ and $\beta$ can be constant (and possibly predetermined). In examples where the recursive filter is implemented as a Kalman filter, values of $\alpha$ and $\beta$ can be dynamic, such that the values of $\alpha$ and $\beta$ change with an uncertainty or variance in the measurements. In either situation, the ACU 550 can select the next yaw correction, $\psi_{correct,i+1}$ as the yaw compensation, $\psi_A$ for the antenna.

The ACU 550 can employ the yaw compensation, $\psi_A$, the initial pointing direction, $v_{LTP}$ in the local tangent plane 510 and the pedestal orientation matrix to determine pedestal orientation coordinates, $v_{Measured}$ in the pedestal local coordinate system 530 using Equation 9.

$$v_{Measured} = (\psi_{off}, \theta_{off}, \varphi_{off})^T [(R(\psi_1 + \psi_A), \theta_1, \varphi_1)]^T v_{LTP} \quad \text{Equation 9}$$

Conceptually, Equation 9 characterizes rotating the initial pointing direction, $v_{LTP}$ in the local tangent plane 510 by the transpose of the INS orientation matrix $[R(\psi_1 + \psi_A), \theta_1, \varphi_1)]^T$ that includes a roll, $\varphi_1$ and a pitch, $\theta_1$ of the attitude for the vehicle provided from the INS 552 and the compensated yaw to the INS local coordinate system 520 to determine INS coordinates. Additionally, Equation 9 characterizes rotating the INS coordinates by the transpose of the pedestal orientation matrix, $[R(\psi_{off}, \theta_{off}, \varphi_{off})]^T$ that includes a set of installation offsets to the pedestal local coordinate system 530 to provide the pedestal orientation coordinates, $v_{Measured}$.

Upon determining the pedestal orientation coordinates, $v_{Measured}$ in the pedestal local coordinate system 530, the ACU 550 can be configured/programmed to determine pointing directions that are employable by the positioner of the antenna system 548 to adjust a pointing direction of the antenna. In some examples, the ACU 550 can employ the pedestal orientation coordinates, $v_{Measured}$ to determine an azimuth and elevation for the antenna that can be provided to the positioner to adjust the pointing direction of the antenna of the antenna system 548.

Additionally, in some examples, the ACU 550 can determine a next residual elevation offset, $El_{correct,i+1}$ that can be employed to adjust the elevation that is determined based on the pedestal orientation coordinates, $v_{Measured}$. The next residual elevation offset, $El_{correct,i+1}$ is based on residual elevation offsets in the pedestal angle, $v_{Ped}$, the scan offset angle, $v_{Scan}$, the pedestal orientation coordinates, $v_{Measured}$ and a current residual elevation offset, $El_{correct,i}$. Additionally, the ACU 550 can employ recursive filtering techniques to determine the next residual elevation offset, $El_{correct,i+1}$, as demonstrated in Equation 10.

$$El_{correct,i+1} = (1-\alpha) \cdot El_{correct,i} + \alpha(EL_{Ped} + EL_{Scan} - EL_{Measured}) \quad \text{Equation 10}$$

wherein:

El(v) is an elevation function defined in Equation 11;

$EL_{Ped}$ is an elevation component of the pedestal coordinates, $v_{Ped}$, and $EL_{Ped} = EL(v_{Ped})$;

$EL_{Scan}$ is an elevation component of the scan offset angle, $v_{Scan}$ and $EL_{Scan}=EL(v_{Scan})$;

$EL_{Measured}$ is an elevation component of the pedestal orientation coordinates, $v_{Measured}$, and $EL_{Measured}=EL(v_{Measured})$; and α defines a parameter of the recursive algorithm, and can be the same value or a different value from the value for α employed in Equation 7;

$$El(v) = -\arcsin(v_z) \qquad \text{Equation 11}$$

wherein:

$v_z$ is the z component of the vector, v.

In summary, the yaw compensation, $\psi_A$ is mostly orthogonal to the elevation axis, but if the pedestal of the antenna system 548 is tilted (pitch or roll not equal to 0°), there can be some small elevation change caused by application of the yaw compensation, $\psi_A$ which elevation corresponds to the next residual elevation offset, $El_{correct,i+1}$. However, to avoid double counting this elevation change, the position already calculated with the yaw correction, $EL_{Measured}$ is subtracted from the measured yaw elevation position, which corresponds to $EL_{Ped}+EL_{Scan}$.

The ACU 550 applies the resultant next residual elevation offset $El_{correct,i+1}$ to the elevation calculated for the pedestal coordinates, $v_{Measured}$. Accordingly, the ACU 550 can provide a control signal to the positioner that causes the positioner to adjust the pedestal of the antenna system 548 to the resultant azimuth and (adjusted) elevation to curtail the impact of yaw drift in the INS 552.

The ACU 550 can be configured to execute the offset compensation operation multiple times (e.g., periodically and/or asynchronously). In such a situation, the ACU 550 can cause the positioner to rotate the pedestal of the antenna system 548 in opposing directions during consecutive executions of the offset compensation operation to curtail an impact of backlash on the positioning of the antenna. For example, if the ACU 550 commands the positioner to rotate the pedestal of the antenna system 548 in a clockwise direction during a signal tracking operation of a given execution of the offset compensation operation, the ACU 550 can command the positioner to rotate the pedestal of the antenna system 548 in a counter-clockwise direction during a signal tracking operation of a next execution of the offset compensation operation.

Accordingly, by implementing the antenna system 548, the ACU 550 can compensate for the yaw drift, $\psi_1$ that is present in the yaw measured by the INS 552. Thus, the need for expensive components (e.g., a ring laser gyroscope) that does not experience yaw drift can be obviated.

Figure 6:
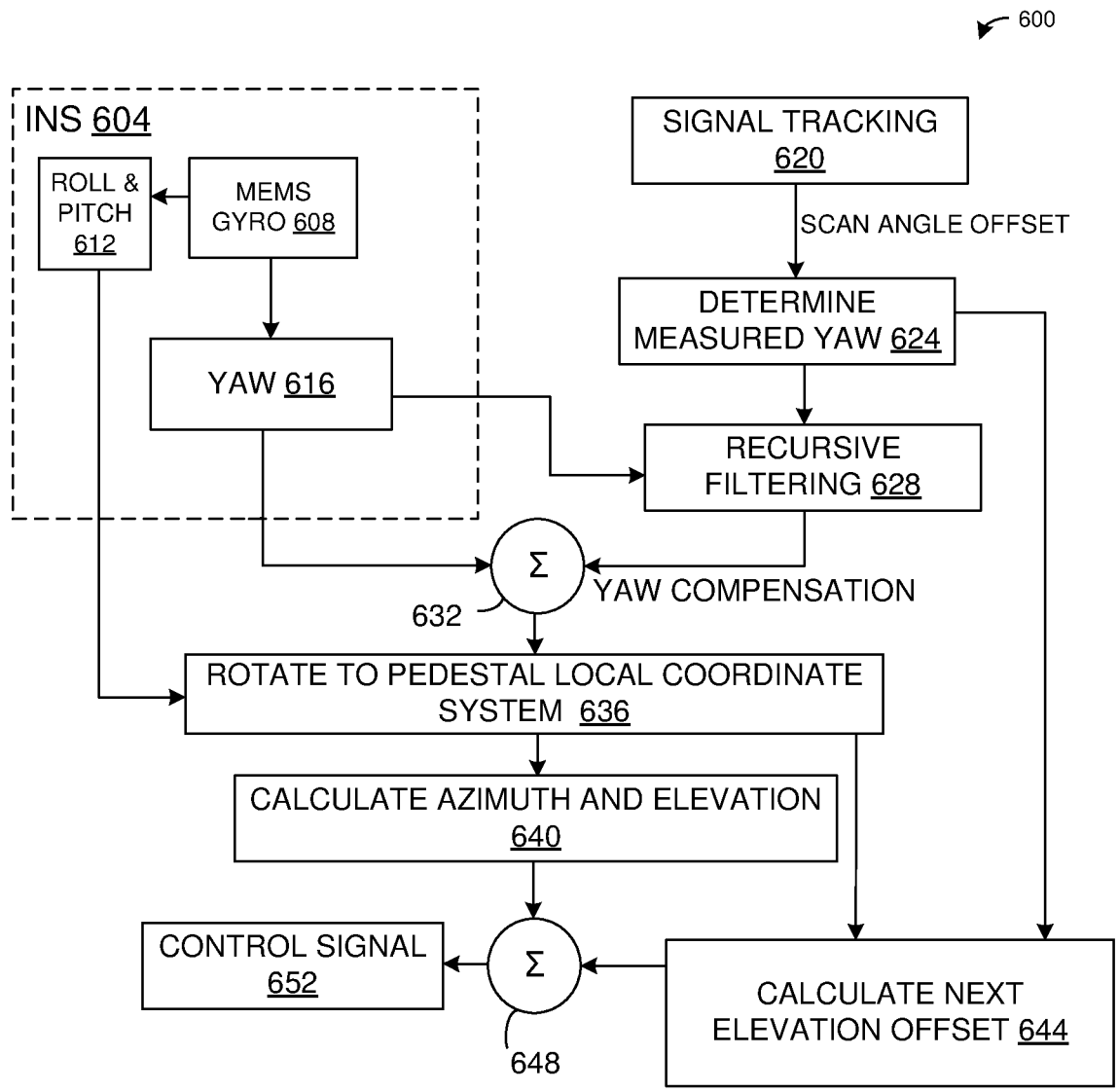
FIG. 6 illustrates a process diagram illustrating example of operations executing during an instance of an offset compensation operation.

FIG. 6 illustrates a process diagram illustrating an example of operations executing during an instance of an offset compensation operation. The process diagram can be implemented, for example with an antenna system 600, such as the antenna system 108 of FIG. 1, the antenna system 200 of FIG. 2 and/or the antenna system 548 of FIG. 5.

In the process diagram, an INS 604 (e.g., the INS 102 of FIG. 1, the INS 270 of FIG. 2 and/or the INS 552) can be mounted on a vehicle (e.g., the vehicle 104 of FIG. 1, the vehicle 204 of FIG. 2 and/or the vehicle 544 of FIG. 5). The INS 604 includes a MEMS gyroscope 608 that can measure an attitude of the vehicle. The attitude can include pitch, $\theta_1$, and roll $\varphi_1$ components 612 and a yaw, $\theta_1$, component 616 as measured by the INS 604. The yaw, $\theta_1$, component 616 can represent a yaw rate change integrated over time.

At 620, an ACU (e.g., the ACU 220 of FIG. 2 and/or the ACU 550 of FIG. 5) of the antenna system 600 can execute a signal tracking operation. The signal tracking operation causes a positioner of the antenna system 600 to adjust a pointing direction of the antenna from an initial angular position, corresponding to a pedestal angle, $v_{Ped}$ in a local coordinate system of a pedestal of the antenna system and to an initial pointing, $v_{LTP}$ defined in a local tangent plane to determine a scan signal offset angle, $v_{Scan}$ that corresponds to a peak gain (or other signal metric) for a signal communicated from the target satellite 540 to the antenna system 548.

At 624, the ACU can determine a measured yaw, $\psi_{measured}$. In some examples, the ACU can employ Equations 4 and 5 to determine the measured yaw, $\psi_{measured}$ More particularly, to determine the measured yaw, $\psi_{measured}$, the ACU can employ Equation 4 to calculate a yaw pointing direction, $v_{Yaw}$ defined in the local tangent plane that is based on the pedestal angle, $v_{Ped}$ and the scan offset angle, $v_{Scan}$. The ACU can employ Equation 5 to determine the measured yaw, $\psi_{measured}$ based on the initial pointing direction, $v_{LTP}$ and the yaw pointing direction, $v_{Yaw}$.

At 628, the ACU can employ recursive filtering (e.g., an alpha beta filter or a Kalman filter) on the measured yaw, $\psi_{measured}$ to determine a next yaw correction, $\psi_{correct,i+1}$. More particularly, the ACU can employ Equations 6-8 to determine the next yaw correction, $\psi_{correct,i+1}$ based on a current yaw correction, $\psi_{correct,i}$, the yaw, $\psi_1$ from the INS 604, and the measured yaw, $\psi_{measured}$. In some examples, the ACU can select the next yaw correction $\psi_{correct,i+1}$ as a yaw compensation, $\psi_A$. In other examples, the recursive filtering at 628 can be omitted, wherein the measured yaw, $\psi_{measured}$ is selected as the yaw compensation, $\psi_A$.

At 632, the ACU can combine (sum) the yaw compensation, $\psi_A$ and the yaw, $\psi_1$ from the INS 604 to determine a yaw compensated position, $\psi_1+\psi_A$. At 636, the ACU can employ Equation 9 to rotate the initial pointing direction, $v_{LTP}$ with a platform orientation matrix to determine pedestal orientation coordinates, $v_{measured}$. More particularly, the platform orientation matrix can include the yaw compensated position, $\psi_1+\psi_A$, the pitch, $\theta_1$, and roll $\varphi_1$ provided from the INS 604, as described in Equation 9.

In some examples, at 640, the ACU can employ the pedestal orientation coordinates, $v_{measured}$ to determine an azimuth and elevation for the antenna of the antenna system 600. In other examples, the pedestal orientation coordinates, $v_{measured}$ can be employed to determine other positional features for the antenna of the antenna system 600.

At 644, the ACU can employ Equations 10 and 11 to determine a next residual elevation offset, $El_{correct,i+1}$. More particularly, the ACU can employ Equation 11 to determine an elevation component of the pedestal orientation coordinates, $El_{Measured}$, an elevation component of the scan offset angle, $El_{Scan}$, and an elevation component of the pedestal angle, $El_{Ped}$. The ACU can employ Equation 10 to determine the next residual elevation offset, $El_{correct,i+1}$ based on a current residual elevation offset, $El_{correct,i}$, the elevation component of the pedestal orientation coordinates, $El_{Measured}$, an elevation component of the scan offset angle, $El_{Scan}$, and an elevation component of the pedestal angle, $El_{Ped}$.

At 648, the next residual elevation offset, $El_{correct,i+1}$ can be combined (added to) with elevation calculated at 640 for the antenna. At 652, the ACU can generate a control signal that causes the positioner of the antenna system 600 to adjust the pointing direction of the antenna to a direction defined by the determined azimuth and elevation.

Figure 7:
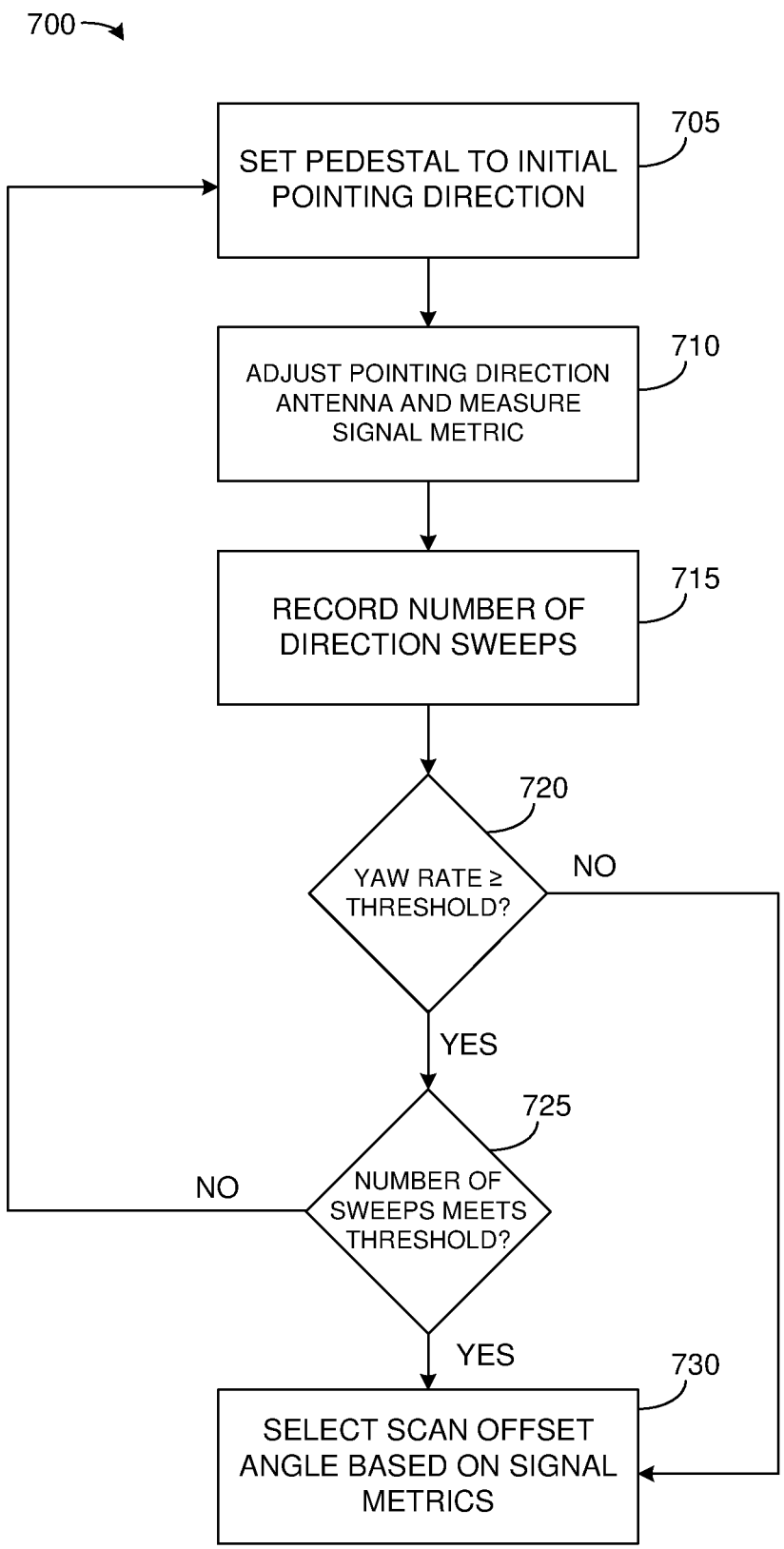
FIG. 7 illustrates a flowchart of an example method for executing signal tracking.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 700 for executing a signal tracking operation (e.g., a conical scan or sine signal scan), such as during an offset compensation operation. The method 700 can be implemented with an antenna system, such as the antenna system 108 of FIG. 1, the antenna system 200 of FIG. 2, the antenna system 548 of FIG. 5 and/or the antenna system 600 of FIG. 6. The antenna system can be mounted on a vehicle (e.g., the vehicle 104 of FIG. 1, the vehicle 204 of FIG. 2 and/or the vehicle 544 of FIG. 5).

At 705, an ACU of the antenna system (e.g., the ACU 220 of FIG. 2 and/or the ACU 550 of FIG. 5) can cause the positioner of the antenna system to set an antenna of the antenna system to an initial angular position that corresponds to an initial pointing direction that is defined in a local tangent plane based on a location of the vehicle and a target satellite.

At 710, the ACU can command the positioner to adjust the pointing direction of the antenna from the initial angular position to a plurality of angular positions (e.g., in a direction sweep operation) and a signal metric of the communicated signal at the plurality of angular positions is measured. As an example, an azimuth and elevation of the antenna can be adjusted to change a yaw of the antenna. Moreover, in some examples, there can be 360 angular positions during the sweep. At 715, the ACU can record a number of times the pointing direction sweep was executed at 710.

At 720, the ACU makes a determination as to whether a yaw rate from an INS mounted on the vehicle (e.g., the INS 102 of FIG. 1, the INS 270 of FIG. 2, the INS 552 of FIG. 5 and/or the INS 604 of FIG. 6) meets or exceeds a threshold level. If the determination at 720 is positive (e.g., YES) indicating that the vehicle is in motion, the method 700 proceeds to 725. If the determination at 720 is negative (e.g., NO), indicating that the vehicle is stationary (or moving slowly), the method 700 proceeds to 730. At 725, another determination is made as to whether the number of times the pointing direction sweep at 710 was executed meets a threshold (e.g., two). If the determination at 725 is negative (e.g., NO), the method 700 returns to 705. If the determination at 725 is positive (e.g., YES), the method 700 proceeds to 730. In this manner, if the vehicle is moving, the direction sweep and signal metrics are recorded multiple times (e.g., twice).

At 730, the ACU selects a scan offset angle based on the measured metrics. In some examples, the scan offset angle can be an angle calculated from an aggregation of the signal metrics. For example, the scan offset angle can be an angle that is calculated to have a greatest signal strength for the signal communicated by the satellite. In some examples, the scan offset angle can be between angles for which signal metrics are measured. In other examples, the scan offset angle can be an angle for which a set of signal metrics was measured.

FIGS. 8A and 8B illustrate a pointing direction (in degrees) of an antenna plotted as a function of time (in seconds) during a signal tracking operation, such as the signal tracking operation (e.g., a conical scan or sine signal scan) illustrated and described with respect to FIG. 7. As noted, in some examples, an ACU (e.g., the ACU 220 of FIG. 2 and/or the ACU 550 of FIG. 5) can compensate for backlash of gears of a positioner (e.g., the positioner 160 of FIG. 1, the positioner 258 of FIG. 2, the positioner 312 of FIG. 3 and/or the positioner 412 of FIG. 4). FIG. 8A illustrates a graph 800 that includes a plot representing an azimuth (AZ) pointing direction of the antenna and a plot that represents an elevation (EL) pointing direction of the antenna, wherein the antenna is rotated in the same direction. That is, in the graph 800, the azimuth and elevation of the antenna would be continuously rotated counter-clockwise in the illustrated example, such that a beam of the antenna is moved in a single angular direction as a function of time.

FIG. 8B illustrates a graph 850 that includes a plot representing an azimuth (AZ) pointing direction of the antenna and a plot that represents an elevation (EL) pointing direction of the antenna, wherein the antenna is rotated in opposite angular directions to curtail an impact of backlash of the gears of the positioner. As illustrated in the graph 850, during a time interval between 0 and 2.5 seconds, the azimuth and elevation of the antenna are rotated in a counter-clockwise direction, and during a time interval between 2.5 and 5 seconds, the azimuth and elevation of the antenna are rotated in a clockwise direction. Thus, during a signal tracking operation (or over multiple signal tracking operations) the beam of the antenna is adjusted along two opposite angular directions such that backlash induced pointing errors are curtailed.

More particularly, as illustrated in the graph 850, during the signal tracking operation (or over multiple signal tracking operations), the beam of the antenna is adjusted along a first angular direction (e.g., counter-clockwise direction) and a signal metric of a signal communicated with a satellite (or other target) is measured at multiple angular positions. The beam is then adjusted along a second angular direction (e.g., clockwise direction) that is opposite the first angular direction and additional measurements of the signal metric are made. A scan offset angle of the target satellite is then estimated based on the signal metrics measured along the first and second angular directions. Thus, the beam of the antenna can then be pointed at the target satellite based on the estimated angular position.

By moving the beam of the antenna in opposite angular directions, the backlash from the gears in the positioner is present in measurements taken during rotation in both angular directions (counter-clockwise and clockwise). In the example illustrated, the impact of the backlash on measurements taken during rotation in the first angular direction counteracts the impact of the backlash on measurements taken during rotation in the second angular direction. Thus, by moving the beam of the antenna in opposite angular directions during the signal tracking operation (or over multiple signal tracking operations) accuracy of an estimate of the actual direction of the target direction for the target satellite (the scan offset angle) is improved relative to moving the beam in a single angular direction.

Accordingly, to curtail the impact of backlash, the ACU can be configured to command the positioner to rotate in opposing directions to change the azimuth and elevation of the antenna during a single signal tracking operation or during consecutive executions of the signal tracking operation and/or the offset compensation operation. For instance, if the antenna is rotated in the counter-clockwise direction during a first execution of the signal tracking operation (e.g., as part of an offset compensation operation) during a second execution of the signal tracking operation (e.g., as part of a next consecutive offset compensation operation), the ACU can command the antenna to rotate in the clockwise direction. Additionally or alternatively, in some examples, the ACU can be configured to command the positioner to rotate in opposing directions to change the azimuth and elevation of the antenna during consecutive executions of a direction sweep (e.g., action 710 of FIG. 7) during a single signal tracking operation.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for pointing an antenna mounted on a vehicle, the method comprising:
   positioning, by a positioner, a beam of the antenna to an initial angular position towards a target satellite based on an initial pointing direction for the antenna, the initial pointing direction being defined in a fixed reference plane and communicating, from the antenna, a signal with the target satellite, wherein the positioner controls an orientation of a pedestal of the antenna; and
   executing, by an antenna control unit (ACU), an offset compensation operation of the antenna, the offset compensation operation comprising:
      adjusting a pointing direction of the antenna from the initial angular position to a plurality of angular positions and measuring a signal metric of the communicated signal at the plurality of angular positions and selecting a scan offset angle based on the measured signal metric for the plurality of angular positions, the scan offset angle being defined in a local coordinate system for the pedestal of the antenna;
      calculating a yaw compensation of the antenna based on the initial pointing direction and on a yaw pointing direction in the fixed reference plane;
      rotating the initial pointing direction in the fixed reference plane with a platform orientation matrix that includes the yaw compensation and an attitude of the vehicle measured by an inertial navigation system (INS) into the local coordinate system for the pedestal of the antenna to provide pedestal orientation coordinates;
      determining an azimuth and elevation for the antenna based on the pedestal orientation coordinates; and
      generating, by the ACU, a control signal characterizing the azimuth and elevation for the positioner that causes the positioner to adjust the pointing direction of the antenna corresponding to the azimuth and elevation for the antenna.

2. The method of claim 1, further comprising:
   setting, by the INS the attitude for the vehicle to be independent of measurements of a magnetometer and a global navigation satellite system (GNSS) of the INS.

3. The method of claim 1, wherein the platform orientation matrix comprises a transpose of an INS orientation matrix and a transpose of a pedestal orientation matrix and the local coordinate system is a first local coordinate system, and the rotating comprises:
   rotating the initial pointing direction in the fixed reference plane by the transpose of the INS orientation matrix that includes a roll, a pitch and a yaw of the attitude for the vehicle provided from the INS and the compensated yaw to a second local coordinate system for the INS to determine INS coordinates; and
   rotating the INS coordinates by the transpose of the pedestal orientation matrix that includes a set of installation offsets to the first local coordinate system for the pedestal to provide the pedestal orientation coordinates.

4. The method of claim 1, wherein the fixed reference plane defines a North, East, Down (NED) reference frame in a global coordinate system based on a position of the vehicle and the target satellite.

5. The method of claim 1, wherein calculating the yaw compensation of the antenna further comprises:
   rotating the initial pointing direction in the fixed reference plane with the platform orientation matrix to provide a pedestal angle in the local coordinate system for the pedestal, the platform orientation matrix including a pitch, roll and yaw of the attitude of the vehicle provided from the INS;
   combining the pedestal angle and the scan offset angle to provide a measured satellite position in the local coordinate system of the pedestal; and
   rotating the measured satellite position in the local coordinate system of the pedestal with a yaw rotation matrix to provide the yaw pointing direction in the fixed reference plane.

6. The method of claim 5, wherein the yaw rotation matrix rotates the measured satellite position in the local coordinate system of the pedestal to the fixed reference plane without removing a yaw component of the measured satellite position in the local coordinate system of the pedestal.

7. The method of claim 5, wherein the platform orientation matrix comprises a transpose of an INS orientation matrix and a transpose of a pedestal orientation matrix and the yaw rotation matrix comprises the pedestal orientation matrix with a yaw component set to a predetermined value and the INS orientation matrix.

8. The method of claim 1, wherein calculating the yaw compensation of the antenna further comprises:
   calculating a measured yaw based on an azimuth of the initial pointing direction in the fixed reference plane and the yaw pointing direction in the fixed reference plane;
   determining a next yaw correction for the antenna based on the measured yaw, a yaw of the attitude for the vehicle provided from the INS and a current yaw correction of the antenna; and
   selecting the next yaw correction as the yaw compensation.

9. The method of claim 5, wherein execution of the offset compensation operation further comprises:
   determining a next residual elevation offset based on a current elevation residual offset, an elevation component of the pedestal angle, an elevation component of the scan offset angle and an elevation component of the pedestal orientation coordinates; and
   adjusting the elevation for the antenna based on the next residual elevation offset.

10. The method of claim 1, wherein the INS comprises a microelectromechanical system (MEMS) gyroscope to measure the attitude of the vehicle.

11. The method of claim 1, wherein the offset compensation operation is executed multiple times, and the control signal causes the positioner to adjust the azimuth and elevation in opposing directions after consecutive executions of the offset compensation operation to compensate for backlash in gears of the positioner.

12. The method of claim 1, wherein the adjusting of the pointing of the antenna to the plurality of angular positions is executed multiple times if the vehicle is moving at a rate that exceeds a threshold.

13. A system, comprising:
an antenna mounted on a pedestal;
a modem coupled to the antenna operable to process signals communicated via the antenna;
a positioner coupled between the antenna and a vehicle, the positioner causing the pedestal to position the antenna based on a control signal; and
an antenna control unit (ACU) operable to cause the positioner to point a beam of the antenna towards a target satellite, wherein, for an initial satellite signal tracking mode during travel segments of the vehicle, the ACU:
commands the positioner to set the beam of the antenna to an initial angular position towards the target satellite based on an initial pointing direction for the antenna, the initial pointing direction being defined in a fixed reference plane to enable communication of a signal between the antenna and the target satellite;
the ACU is operable to execute an offset compensation operation during travel segments of the vehicle, wherein during the offset compensation operation, the ACU:
commands the positioner to adjust a pointing direction of the antenna from the initial angular position to a plurality of angular positions, measures a signal metric of the communicated signal at the plurality of angular positions and selects a scan offset angle based on the measured signal metric for the plurality of angular positions, the scan offset angle being defined in a local coordinate system for the pedestal of the antenna;
calculates a yaw compensation of the antenna based on the initial pointing direction and on a yaw pointing direction in the fixed reference plane;
rotates the initial pointing direction in the fixed reference plane with a platform orientation matrix that includes the yaw compensation and an attitude of the vehicle measured by an inertial navigation system (INS) into the local coordinate system for the pedestal of the antenna to provide pedestal orientation coordinates;
determines an azimuth and elevation for the antenna based on the pedestal orientation coordinates; and
generates the control signal characterizing the azimuth and elevation for the positioner that causes the positioner to adjust the pointing direction of the antenna corresponding to the azimuth and elevation for the antenna.

14. The system of claim 13, wherein the INS sets the attitude of the vehicle to be independent of measurements from a magnetometer and a global navigation satellite system (GNSS) of the INS.

15. The system of claim 13, wherein the platform orientation matrix comprises a transpose of an INS orientation matrix and a transpose of a pedestal orientation matrix and the local coordinate system is a first local coordinate system, and the rotating comprises:
rotating the initial pointing direction in the fixed reference plane by the transpose of the INS orientation matrix that includes a roll, a pitch and a yaw of the attitude for the vehicle provided from the INS and the compensated yaw to a second local coordinate system for the INS to determine INS coordinates; and
rotating the INS coordinates by the transpose of the pedestal orientation matrix that includes a set of installation offsets to the first local coordinate system for the pedestal to provide the pedestal orientation coordinates.

16. The system of claim 13, wherein the fixed reference plane defines a North, East, Down (NED) reference frame in a global coordinate system based on a position of the vehicle and the target satellite.

17. The system of claim 13, wherein calculating the yaw compensation of the antenna further comprises:
rotating the initial pointing direction in the fixed reference plane by the platform orientation matrix to provide a pedestal angle in the local coordinate system for the pedestal, the platform orientation matrix including a pitch, roll and yaw of the attitude of the vehicle provided from the INS;
combining the pedestal angle and the scan offset angle to provide a measured satellite position in the local coordinate system of the pedestal; and
rotating the measured satellite position in the local coordinate system of the pedestal with a yaw rotation matrix to provide the yaw pointing direction in the fixed reference plane.

18. The system of claim 13, wherein calculating the yaw compensation of the antenna further comprises:
calculating a measured yaw based on an azimuth of the initial pointing direction in the fixed reference plane and the yaw pointing direction in the fixed reference plane;
determining a next yaw correction for the antenna based on the measured yaw, a yaw estimate provided from the INS and a current yaw correction of the antenna; and
selecting the next yaw correction as the yaw compensation.

19. The system of claim 17, wherein execution of the offset compensation operation further comprises:
determining a next residual elevation offset based on a current elevation offset, an elevation component of the pedestal angle, an elevation component of the scan offset angle and an elevation component of the pedestal orientation coordinates; and
adjusting the elevation for the antenna based on the next residual elevation offset.

20. The system of claim 13, wherein the offset compensation operation is executed multiple times, and the control signal causes the positioner to adjust the azimuth and elevation in opposing directions after consecutive executions of the offset compensation operation to compensate for backlash in gears of the positioner and the INS comprises a microelectromechanical system (MEMS) gyroscope to measure the attitude of the vehicle.

* * * * *